(12) United States Patent
Rao et al.

(10) Patent No.: US 6,728,617 B2
(45) Date of Patent: *Apr. 27, 2004

(54) METHOD FOR DETERMINING A DANGER ZONE FOR A PRE-CRASH SENSING SYSTEM IN A VEHICLE HAVING A COUNTERMEASURE SYSTEM

(75) Inventors: Manoharprasad K. Rao, Novi, MI (US); Nikolay V. Smirnov, St. Petersburg (RU); Kwaku O. Prakah-Asante, Commerce Twp., MI (US); Gary Steven Strumolo, Beverly Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

This patent is subject to a terminal disclaimer.

(21) Appl. No.: 10/201,666

(22) Filed: Jul. 23, 2002

(65) Prior Publication Data

US 2004/0019420 A1 Jan. 29, 2004

(51) Int. Cl.$^7$ .............................................. B60R 22/00
(52) U.S. Cl. .................. 701/45; 701/300; 701/301; 342/42; 342/72
(58) Field of Search .................. 701/301, 45, 300, 701/302; 342/72, 42, 43, 52, 55, 70, 71; 340/901, 902, 903

(56) References Cited

U.S. PATENT DOCUMENTS 5,691,725 A * 11/1997 Tanaka ........................ 342/126
6,085,151 A    7/2000 Farmer et al. .............. 701/301
6,452,535 B1 * 9/2002 Rao et al. ...................... 342/72

OTHER PUBLICATIONS

Shiraishi, Masatake; Tsuchiya, Yukiya; "Car Crash Zones Based On Driver's Collision Avoidance Behavior"; 2001 ASME Int'l. Mechanical Engineering Congress and Exposition; Nov. 11–16, 2001, NY, NY; DE–vol. 112 IMECE2001/DE–23260.

Seiler, Peter, Bongsob, Song, Hedrick, J. Karl; "Development of a Collision Avoidance System", SAE Technical Paper Series 980853; International Congress and Exposition, Detroit, MI; Feb. 23–26, 1998.

* cited by examiner

*Primary Examiner*—Marthe Y. Marc-Coleman
(74) *Attorney, Agent, or Firm*—Frank A. MacKenzie

(57) ABSTRACT

A pre-crash sensing system (10) for a source vehicle (50) having a source vehicle length and a source vehicle width that is coupled to a countermeasure system (30) is described. The system includes an object sensor (17) having a radar sensor (18) generating an object distance signal and an object relative velocity signal, and a vision system (20) generating an object classification signal. A controller (12) is coupled to the object sensor for activating the countermeasure system (30) based on the object distance, relative velocity and the object classification signal.

17 Claims, 10 Drawing Sheets

METHOD FOR DETERMINING A DANGER ZONE FOR A PRE-CRASH SENSING SYSTEM IN A VEHICLE HAVING A COUNTERMEASURE SYSTEM

RELATED APPLICATIONS

The present invention is related to U.S. Applications Ser. No. 10/201,664 entitled "Method For Determining A Time To Impact In A Danger Zone For A Vehicle Having A Pre-crash Sensing System" and Ser. No. 10/201,369 entitled "Method For Classifying An Impact In A Pre-crash Sensing System In A Vehicle Having A Countermeasure System", filed simultaneously herewith and hereby incorporated by reference.

TECHNICAL FIELD

The present invention relates to pre-crash sensing systems for automotive vehicles, and more particularly, to pre-crash sensing systems having countermeasures operated in response to the length and width of a detected vehicle.

BACKGROUND

Auto manufacturers are investigating radar, lidar, and vision-based pre-crash sensing systems to improve occupant safety. Current vehicles typically employ accelerometers that measure vehicle body decelerations in the event of a crash. In response to accelerometers, airbags or other safety devices are deployed.

In certain crash situations it would be desirable to provide information before forces actually act upon the vehicle when a collision is unavoidable. Such information may include the position of a target vehicle relative to a source vehicle.

Remote sensing systems using radar are used in adaptive cruise control, collision avoidance and collision warning applications. These systems have characteristic requirements for false alarms. Generally, the remote sensing system reliability requirements for pre-crash sensing for automotive safety related systems are more stringent than those for comfort and convenience features, such as, adaptive cruise control. The reliability requirements even for safety related features vary significantly, depending upon the safety countermeasure under consideration. For example, tolerance towards undesirable activations may be higher for activating motorized belt pre-tensioners than for functions such as vehicle suspension height adjustments. Non-reversible safety countermeasures, including airbags, require extremely reliable sensing systems for pre-crash activation.

To meet wide-angle coverage requirements for pre-crash sensing purposes, multiple pulsed radar based sensing systems are being investigated for automotive applications. Multiple, pulsed radar sensor based systems with a wide field of coverage are available. Triangulation techniques with individual radar range measurements are used with multiple pulsed radar systems for object position estimation.

Threat assessment concepts based on the width and path of the host vehicle, and tracked objects are also available. These concepts do not properly account for the dimensions of the host and target vehicles. They also do not address the issue of impact situation classification. For example, they do not separate between those potential collisions in which the front of the host vehicle is involved, and those in which the sides of the host vehicle are involved.

The length and width of the host and target vehicles are important in deciding whether the accident is going to happen or whether it is going to be a near miss situation. Also, for countermeasure deployment decisions, such as nose-dipping, it is necessary to know if the front or sides of the host vehicle will be involved in the accidents.

It would therefore be desirable to provide a reliable method for determining the position of a target vehicle. It would also be desirable to provide a system that takes into consideration the size of the object including the length of the object in the activation of a countermeasure.

SUMMARY OF THE INVENTION

The present invention provides an improved pre-crash sensing system that reduces false activations and activates a countermeasure in response to the size of the object detected.

In one aspect of the invention, a pre-crash sensing system for a source vehicle (sometimes also referred to as the host vehicle) having a source vehicle length and a source vehicle width that is coupled to a countermeasure system is described. The system includes an object sensor for generating an object distance signal, object relative velocity signal and an object classification signal. A controller is coupled to the object sensor for activating the countermeasure system in response to the object distance, relative velocity and the object classification signal.

In a further aspect of the invention, a method for operating a pre-crash sensing system for an automotive vehicle having a countermeasure system, said method comprises: determining an object distance, an object relative velocity and an object classification with an object sensor; determining an object length and object width corresponding to the object classification; and activating the countermeasure system in response to the object length and object width and the object distance and relative velocity.

One advantage of the invention is that the length and width of the sensed object may be taken into consideration. This is extremely useful if the object is another automotive vehicle such as a sport utility, car or truck. By knowing the size of the vehicle, different countermeasures and different countermeasure activation modes may be chosen.

Another advantage of the invention is that unintentional, inadvertent or unnecessary activations of countermeasure devices are minimized.

Other advantages and features of the present invention will become apparent when viewed in light of the detailed description of the preferred embodiment when taken in conjunction with the attached drawings and appended claims.

and the target vehicle is approaching from the right.

Figure 4:
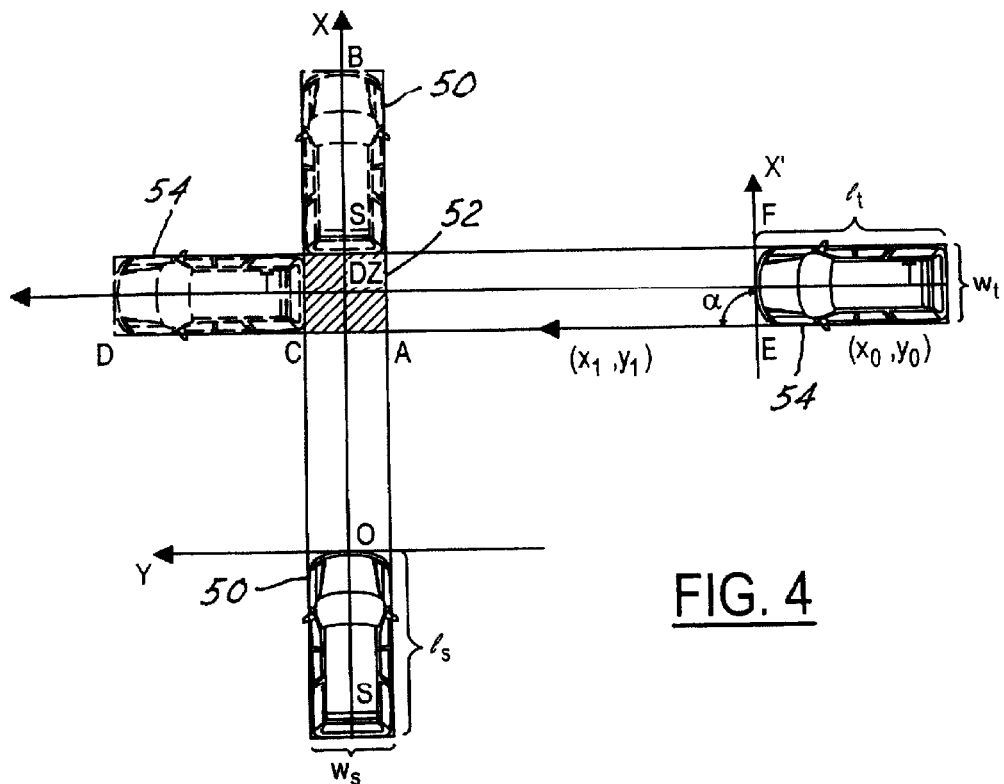

FIG. 4 is a top view of source vehicle and a target vehicle wherein the angle between the paths of the target vehicle and the source vehicle is equal to $$\frac{\pi}{2}$$

and the target vehicle is approaching from the right.

Figure 5:
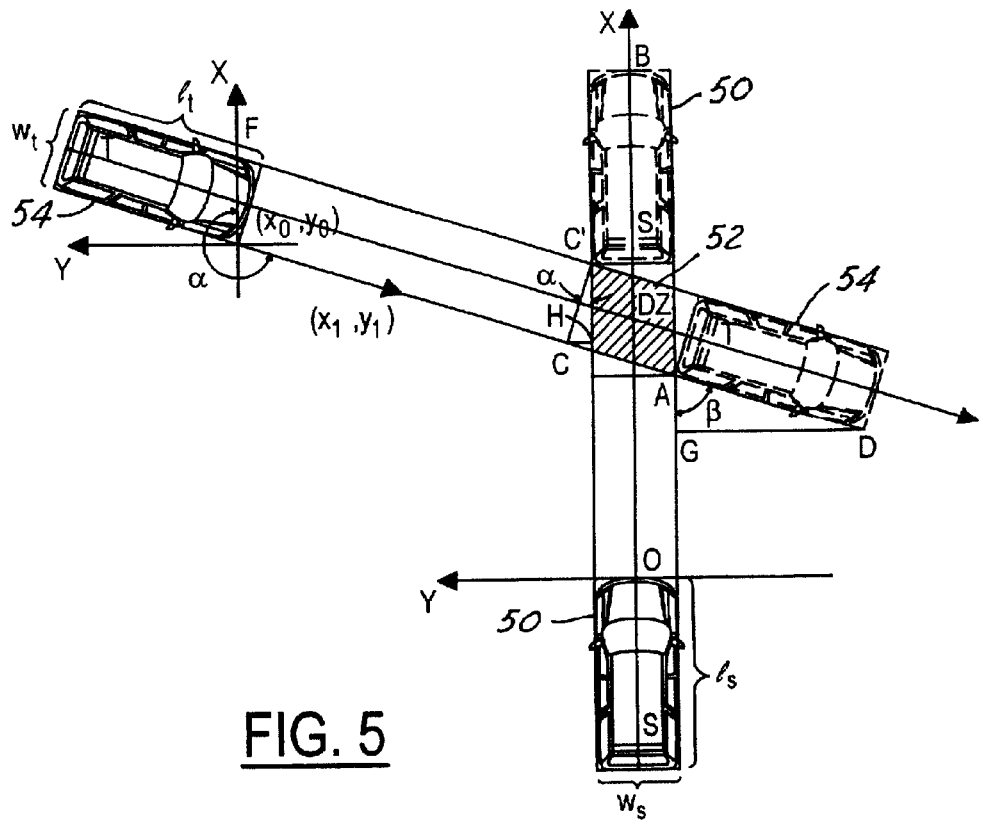

FIG. 5 is a top view of source vehicle and a target vehicle wherein the angle between the paths of the target vehicle and the source vehicle is between π and $$\frac{3\pi}{2}$$

and the target vehicle is approaching from the left.

Figure 6:
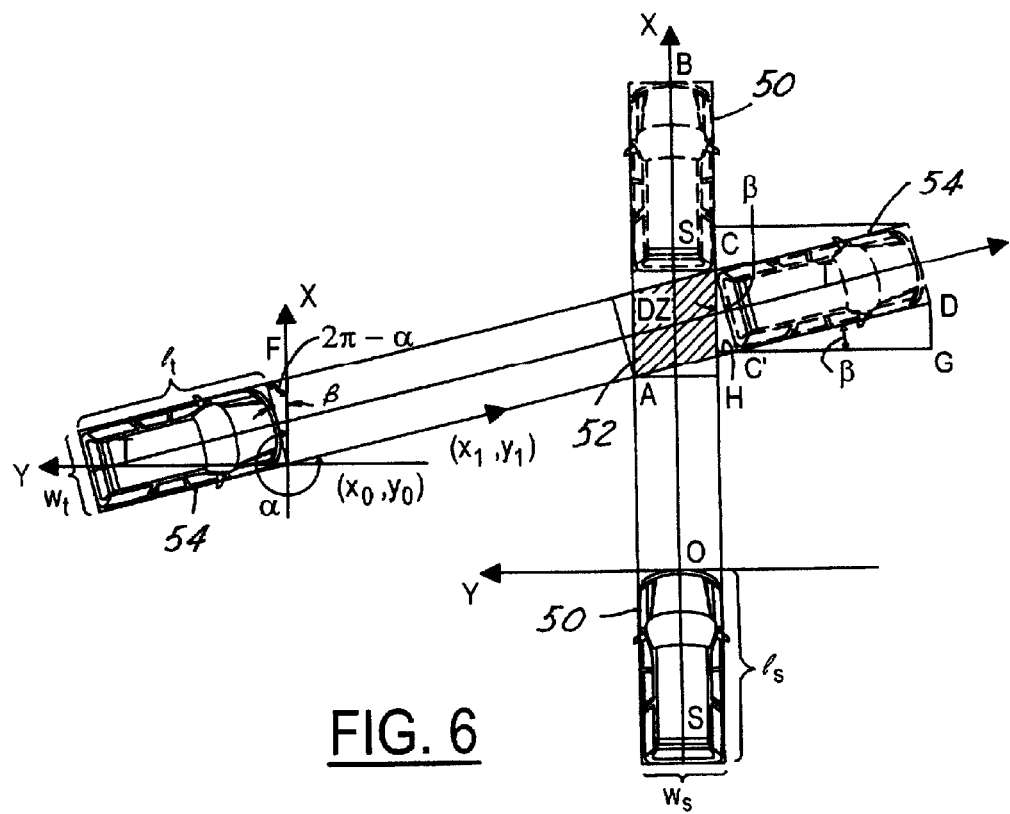

FIG. 6 is a top view of source vehicle and a target vehicle wherein the angle between the paths of the target vehicle and the source vehicle is between $$\frac{3\pi}{2}$$

and 2π and the target vehicle is approaching from the left.

Figure 7:
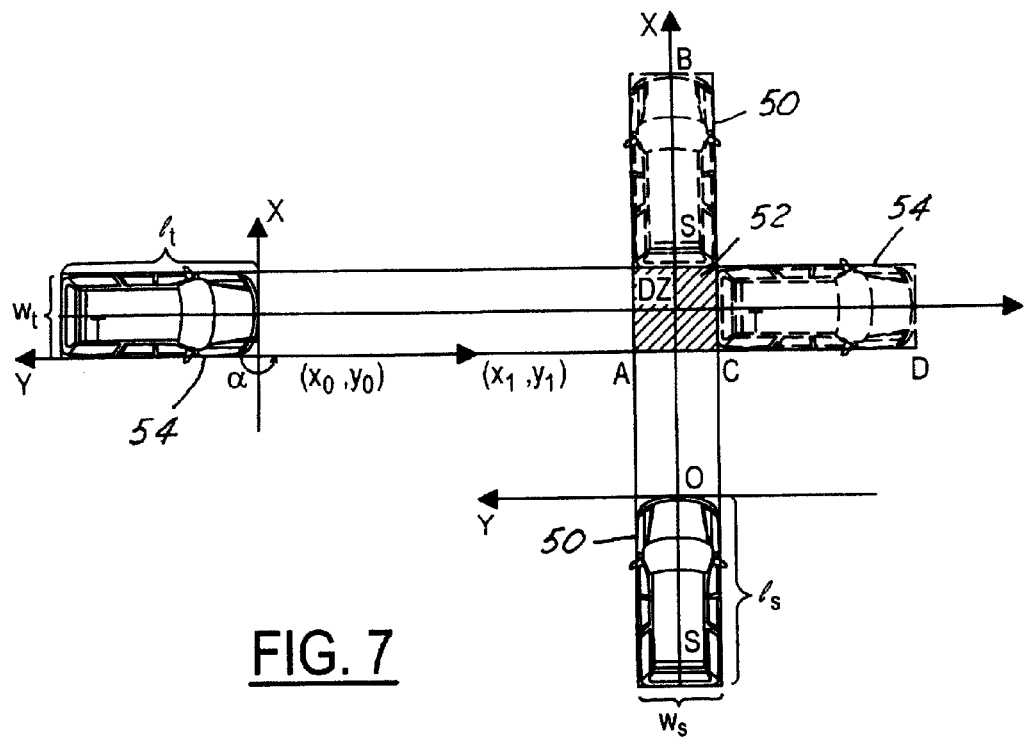

FIG. 7 is a top view of source vehicle and a target vehicle wherein the angle between the paths of the target vehicle and the source vehicle is equal to 3π/2 and the target vehicle is approaching from the left.

Figure 2:
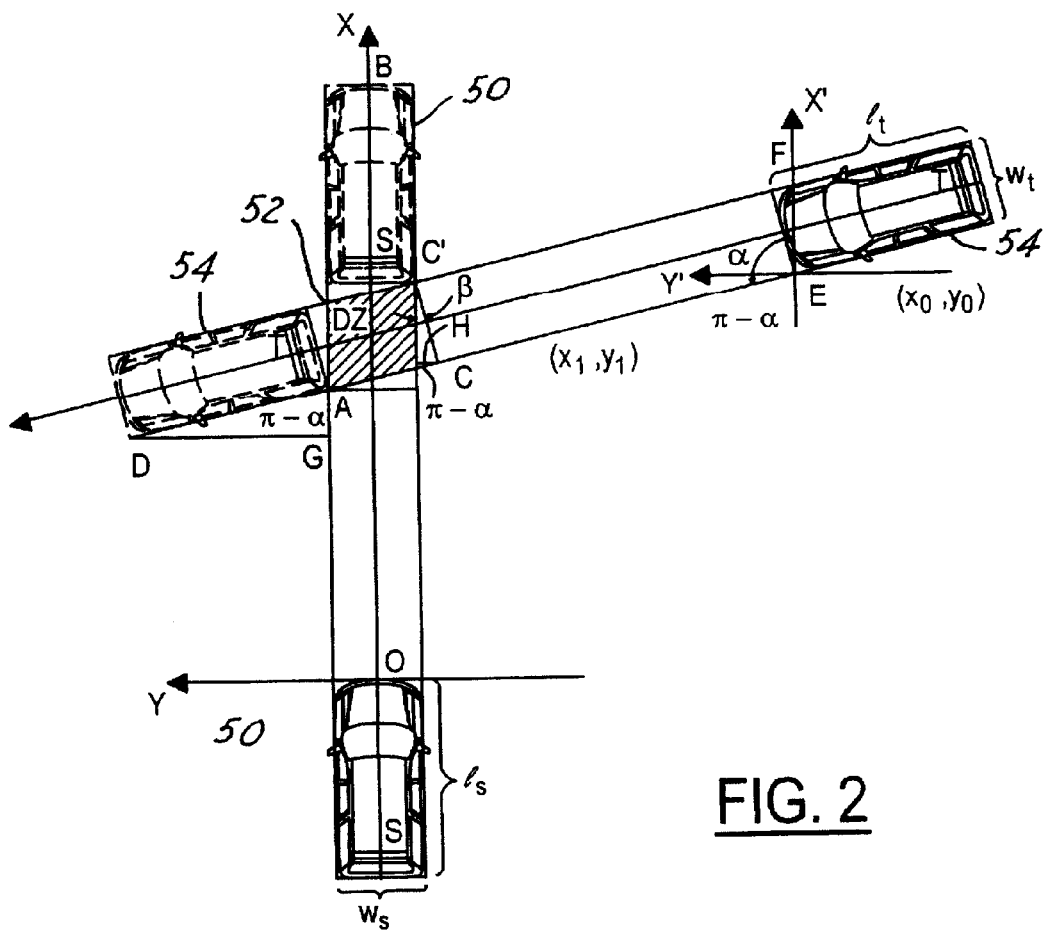
FIG. 2 is a top view of source vehicle and a target vehicle wherein the angle between the paths of the target vehicle and the source vehicle is between $\pi/2$ and $\pi$ and the target vehicle is approaching from the right.
Figure 8:
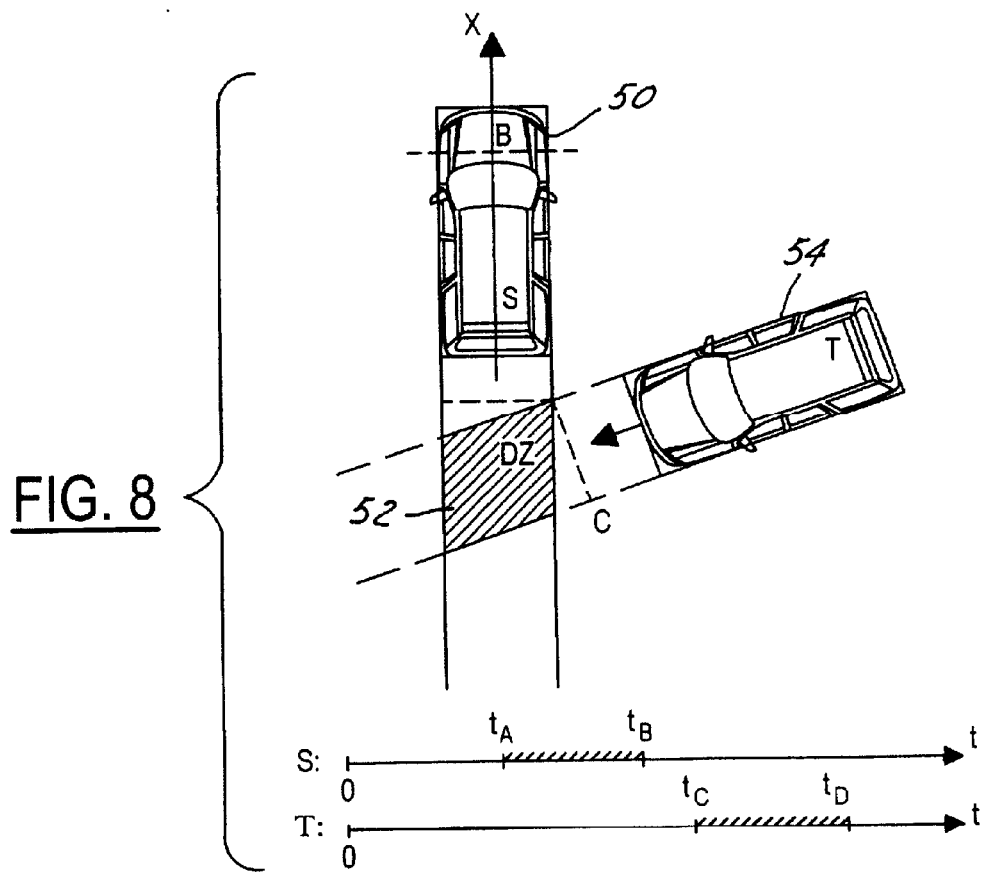

FIG. 8 is a top view of FIG. 2 along with the corresponding time intervals of the source vehicle and the target vehicle in a non-dangerous intersection scenario.

Figure 9:
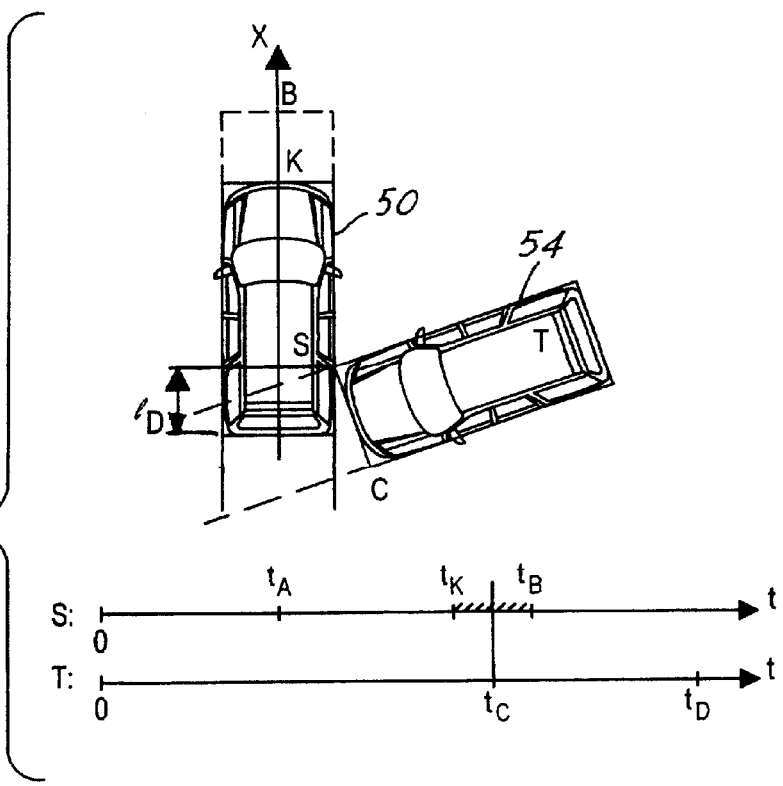

FIG. 9 is a top view of FIG. 2 along with the corresponding time intervals of the source vehicle and the target vehicle in a source vehicle right side impact scenario toward the rear of the vehicle.

Figure 10:
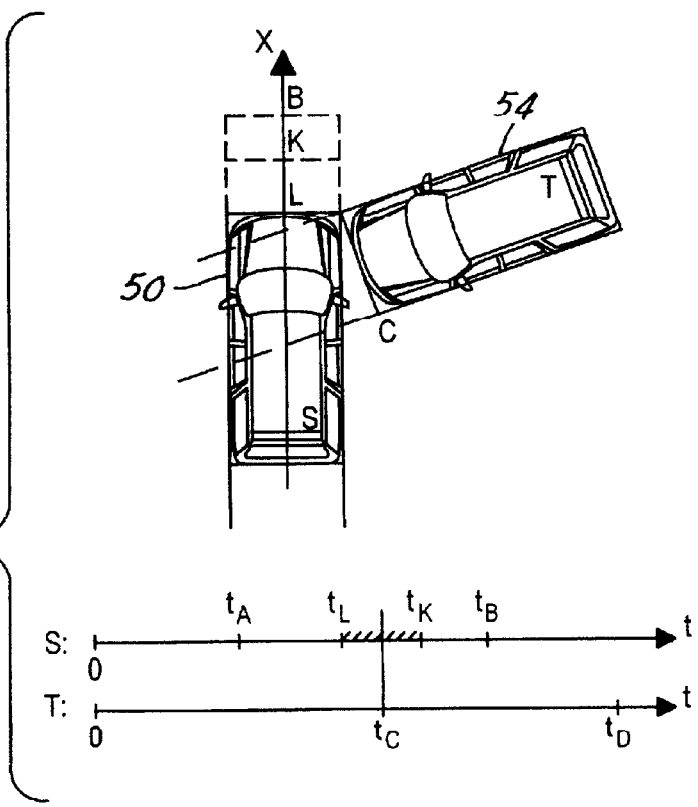

FIG. 10 is a top view of FIG. 2 along with the corresponding time intervals of the source vehicle and the target vehicle in a source vehicle right side impact scenario toward the front of the vehicle.

Figure 11:
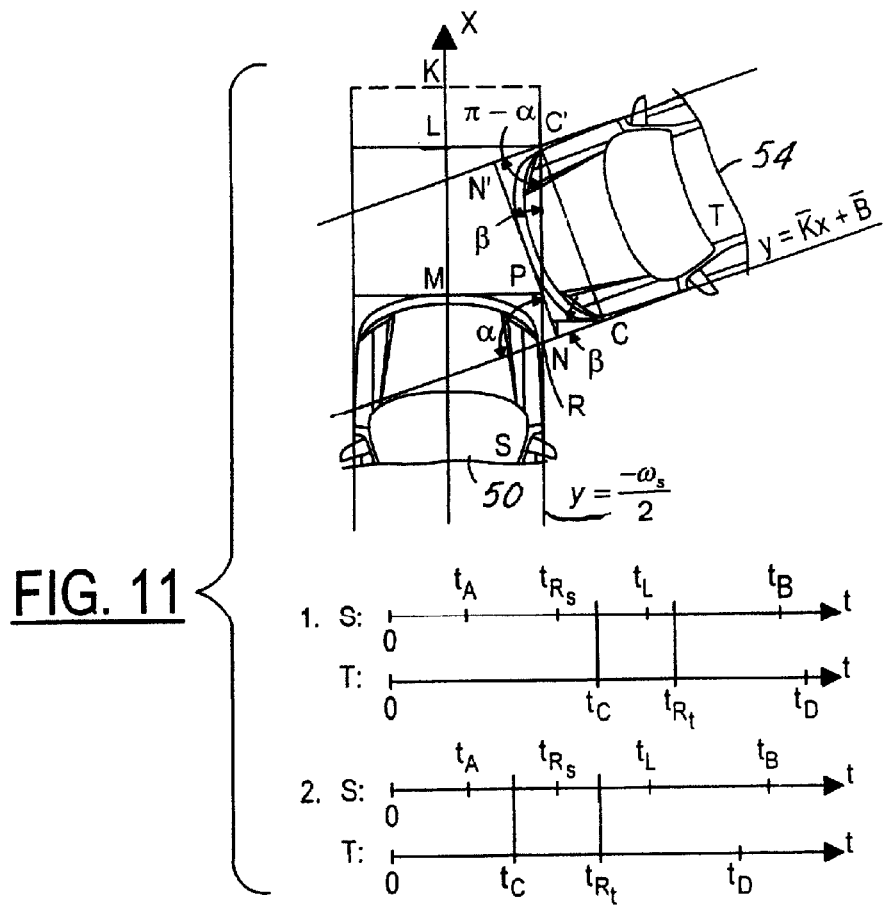

FIG. 11 is a top view of FIG. 2 along with the corresponding time intervals of the source vehicle and the target vehicle in a source vehicle front corner impact scenario.

Figure 12:
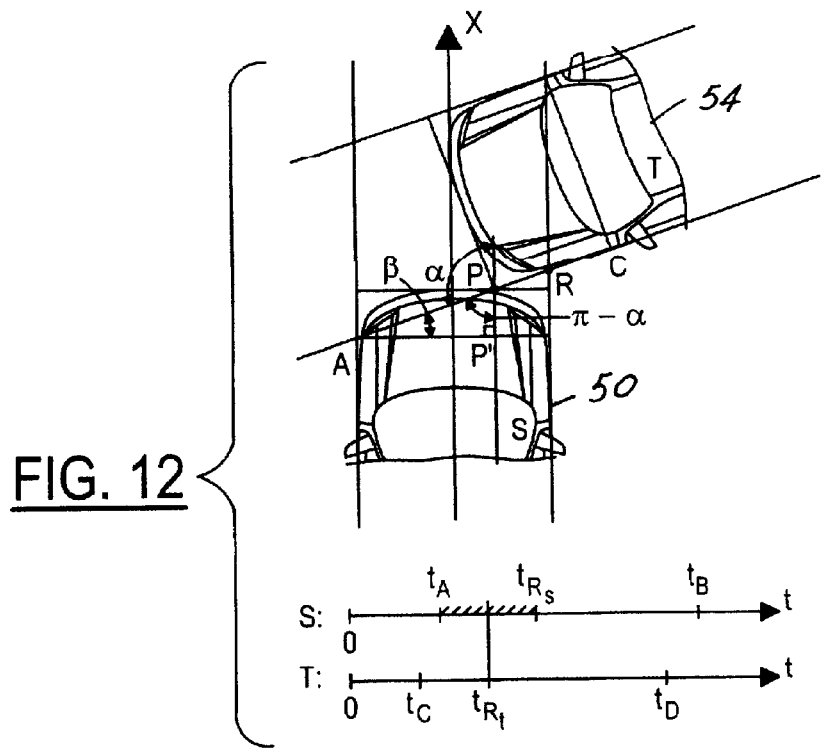
Figure 14C:
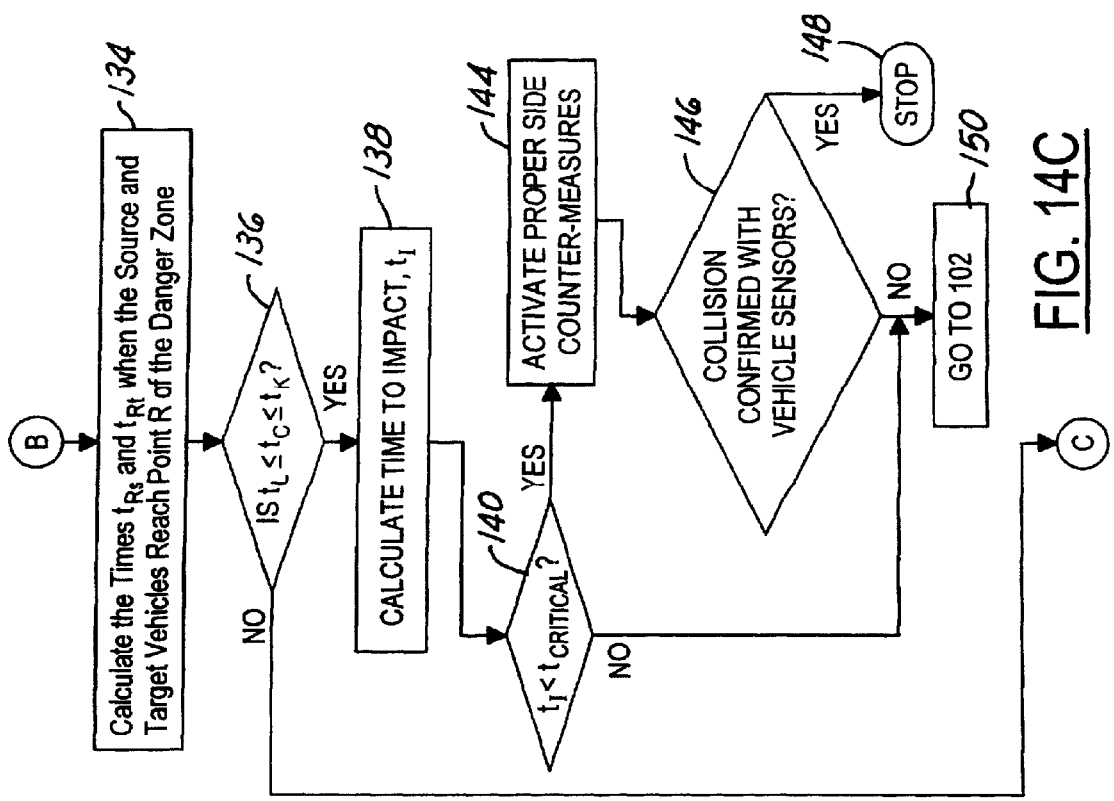

FIG. 12 is a top view of FIG. 2 along with the corresponding time intervals of the source vehicle and the target vehicle in a source vehicle front impact scenario.

Figure 13:
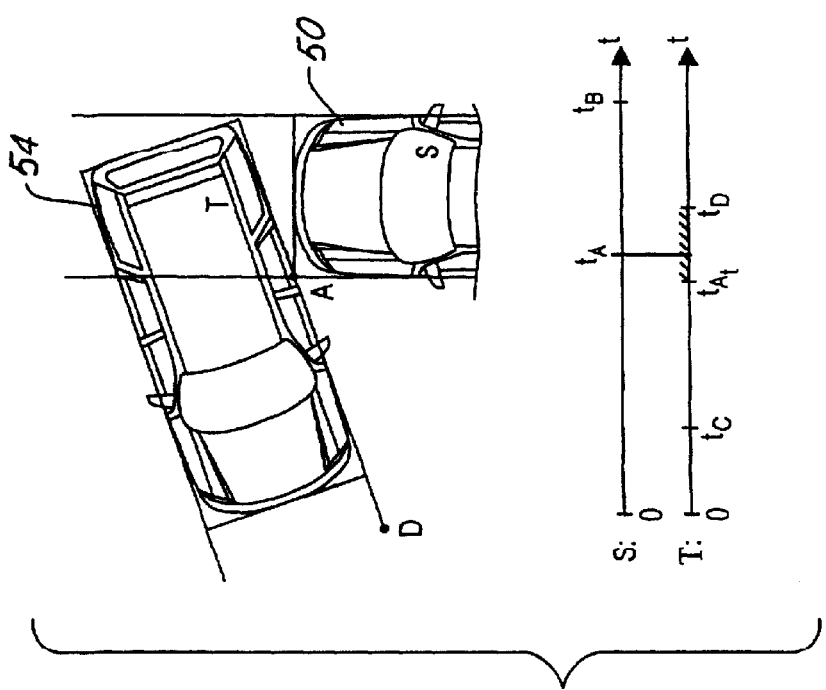
Figure 14A:
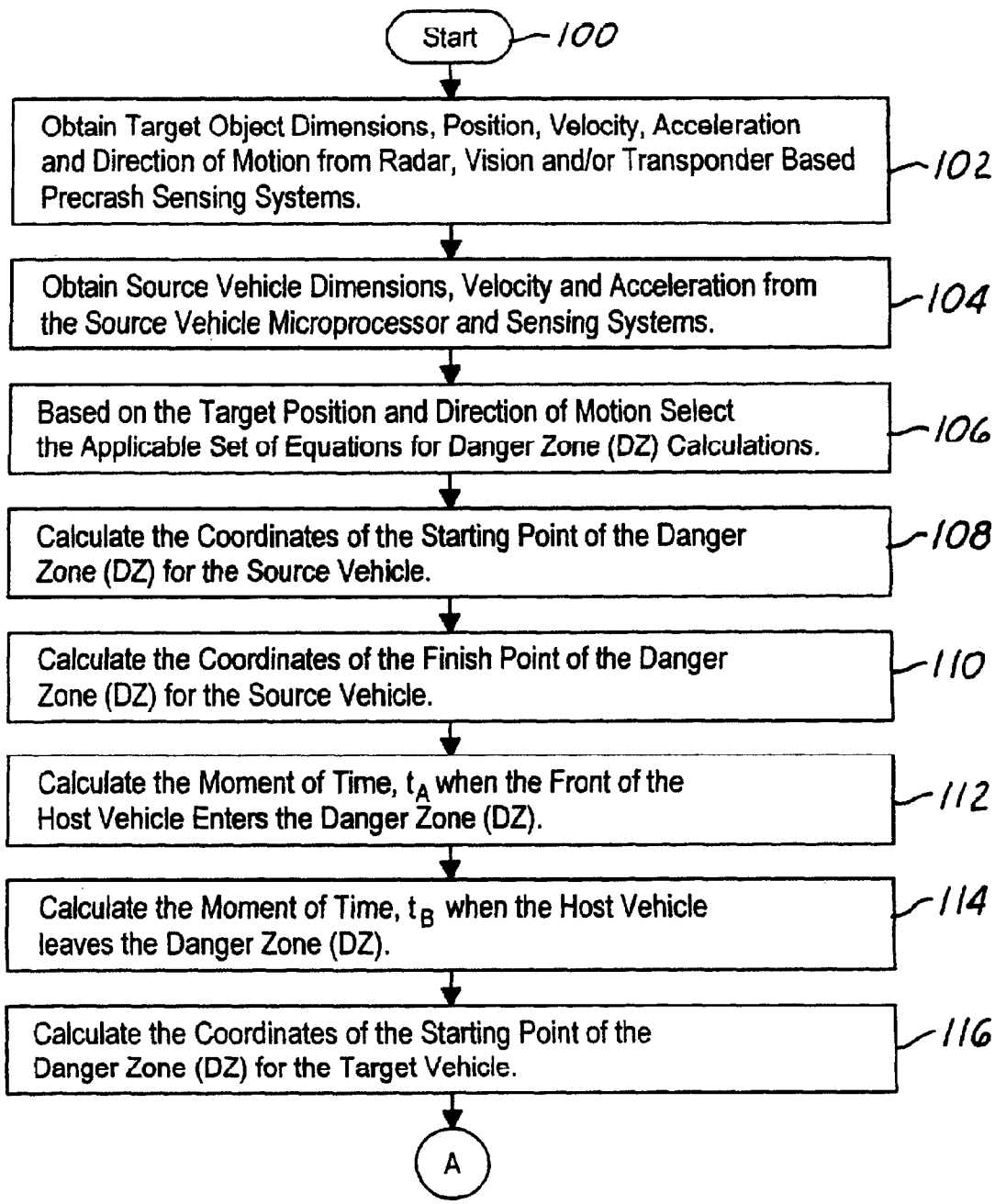
Figure 14B:
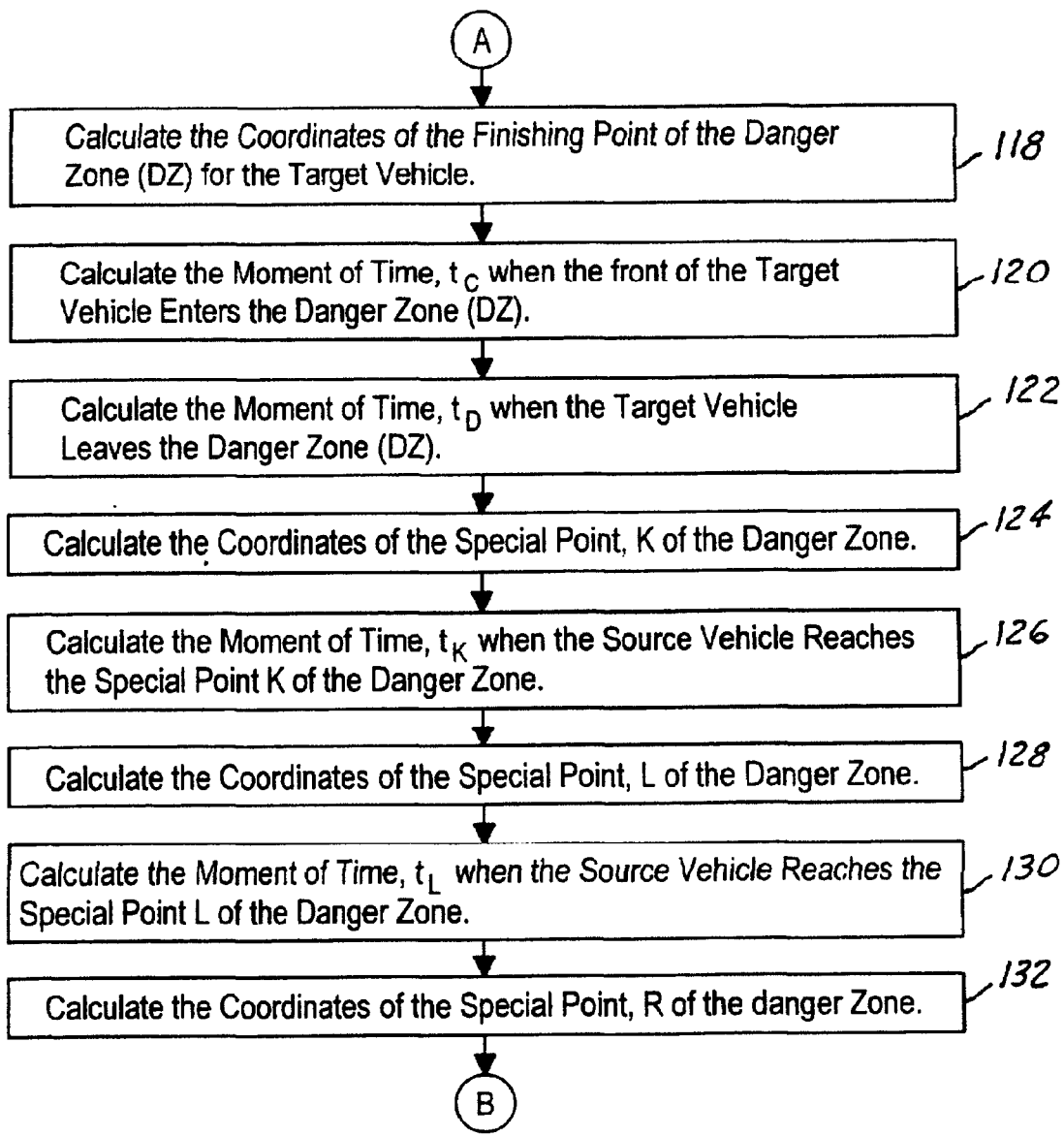
Figure 14E:
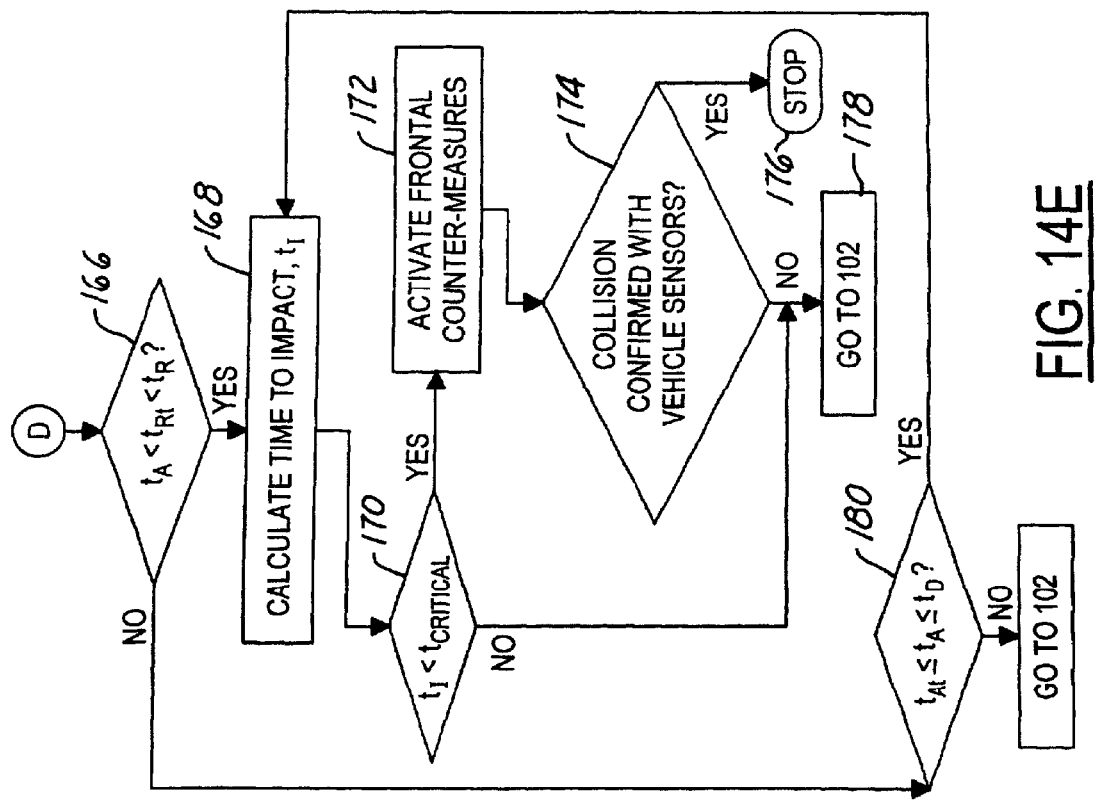
Figure 14D:
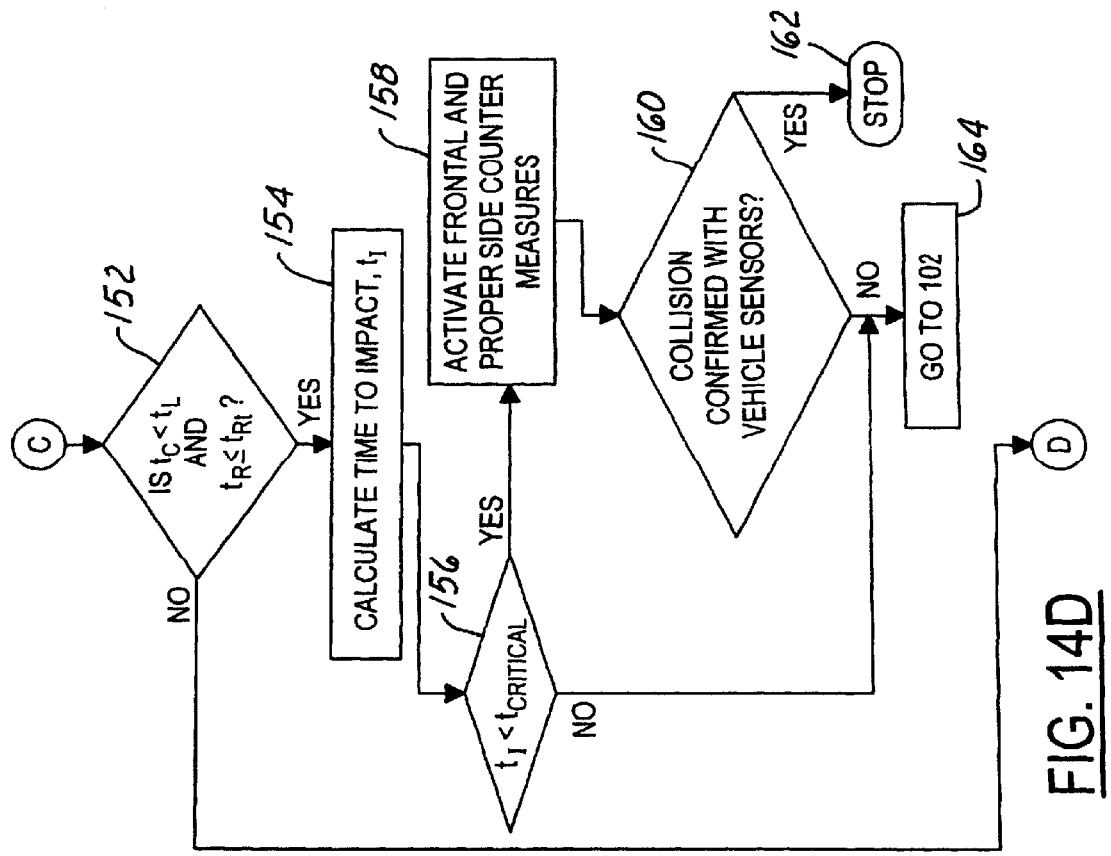

FIG. 13 is a top view of FIG. 2 along with the corresponding time intervals of the source vehicle and the target vehicle in a target vehicle side impact scenario.

FIGS. 14A–14E are a continuing flow chart of a method for operating the pre-crash sensing system according to the present invention.

DETAILED DESCRIPTION OF THE PREFERRED EMBODIMENT

In the following figures the same reference numerals will be used to identify the same components. While the present invention is illustrated with respect to several types of remote object sensors, various types and combinations of remote object sensors may be used as will be further described below. In the following the direction of the vehicles is presumed to be linear at least for the short time of the image processing.

Figure 1:
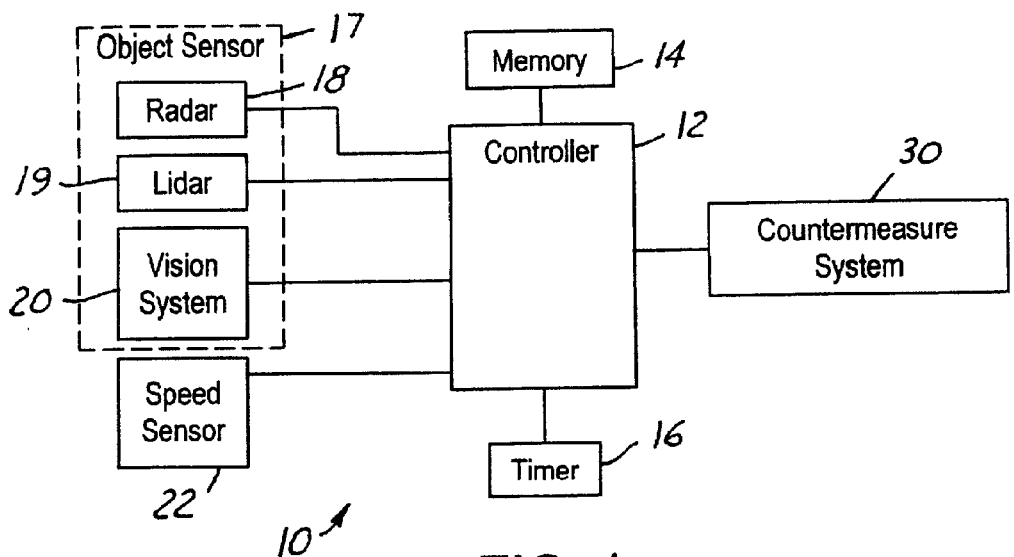
FIG. 1 is a block diagrammatic view of a pre-crash sensing system according to the present invention.

Referring now to FIG. 1, a pre-crash system 10 has a controller 12. Controller 12 is preferably a microprocessor-based controller that is coupled to a memory 14 and a timer 16. Memory 14 and timer 16 are illustrated as separate components from that of controller 12. However, those skilled in the art will recognize that memory 14 and timer 16 may be incorporated into controller 12.

Memory 14 may comprise various types of memory including read only memory, random access memory, electrically erasable programmable read only memory, and keep alive memory. Memory 14 is used to store various thresholds and parameters as will be further described below. For example, the source vehicle length and width may be stored therein.

Timer 16 is a timer such as a clock timer of a central processing unit within controller 12. Timer 16 is capable of timing the duration of various events as well as counting up or counting down.

The controller is coupled to an object sensor 17. Object sensor 17 generates an object distance signal, an object relative velocity signal, and an object classification signal. Object sensor 17 may be implemented using a radar 18, a lidar 19, or a vision system 20 alone or in combinations thereof.

Radar sensor 18 generates an object signal in the presence of an object within its field of view. Radar sensor 18 generates a radar range signal corresponding to the range or position of an object from the radar sensor 18. The radar sensor 18 may also provide range-rate information corresponding to the closing rate of an object to the radar sensor 18.

Lidar sensor 19 may also generate an object range signal in the presence of an object within its field of vision. Range-rate may also be provided by a lidar sensor.

Vision system 20 may be comprised of one or more cameras, CCD, or CMOS type devices. Vision system 20 classifies an object based upon the object's size within the field of view. For example, a vehicle may be identified and the type of vehicle such as a car, sport utility vehicle, van, or truck may be determined. The vision system 20 thus generates a classification signal based on the object in its field of view (corresponding to the pixels therein).

A speed sensor 22 is also coupled to controller 12. Speed sensor 22 may be one of a variety of speed sensors known to those skilled in the art. For example, a suitable speed sensor 22 may include a sensor at every wheel that is averaged by controller 12. Preferably, controller translates the wheel speeds into the speed of the vehicle. Suitable types of speed sensors 22 may include, for example, toothed wheel sensors such as those employed on anti-lock brake systems.

Controller 12 is used to control the activation of a countermeasure system 30. Countermeasure system 30 may include one or several types of countermeasures each having an individual actuator associated therewith. In that case, controller 12 may direct the individual countermeasure actuator to activate the countermeasure. Various types of countermeasure systems will be evident to those skilled in the art. Examples of a countermeasure within countermeasure system 30 include occupant belt pretensioning, bumper-height changing, braking, the pre-arming of internal airbags, the deployment of exterior or internal airbags, pedal control, steering column position, head restraint and knee bolster control. Preferably, controller 12 is programmed to activate the appropriate countermeasure in response to the inputs from the various sensors. As will be described below, the controller 12 may choose the countermeasure based on the position and other pertinent data of the target vehicle.

Referring now to FIG. 2, a source vehicle 50 is illustrated having a danger zone 52 in front thereof. The dimensions of the danger zone 52 are determined by the width and length of the source vehicle 50 and the length and width of the target vehicle 54. The determination of the dimensions of the changer zone 52 are described below.

In the following determination, the threat assessment algorithm is developed with the following assumptions:

Target object recognition and target tracking are obtained by means of vision or vision and radar pre-crash sensing systems. Target vehicle's dimensions, the target vehicle's initial position ($x_0, y_0$), its initial velocity $v_{t0}$, acceleration $a_t$, and direction of motion $\alpha$, at time $t_0$ are obtained from target tracking;

Host vehicle velocity $v_s$, and its acceleration $a_s$, are known from the sensors of FIG. 1;

The host vehicle and the target near-zone trajectories are approximated as straight lines; and The pre-crash sensing system is tracking the nearest point on the target vehicle.

With the above assumptions, a method for describing the possible impact danger zone, (using the linear dimensions $l_s$, $w_s$ of the host vehicle, $l_t$, $w_t$ of the target vehicle) and an algorithm for calculating the coordinates of possible impact points in the $O_{XY}$ coordinate system are developed. (The origin of the $O_{XY}$ coordinate system is located at the center of the host vehicle front bumper and the X-axis is aligned with the host vehicle travel direction). The algorithm also calculates the time intervals, when the host and target vehicles will be in the impact danger zone for threat assessment and impact situation classification.

In the following, the coordinates of points A, B, C, and D, the boundary points of the danger zone 52, are determined. The equation for a straight line that includes two known positions of target ($x_0, y_0$), ($x_1, y_1$). in the $O_{XY}$ coordinate system is obtained from the equation $y = kx + b$, by finding unique values of k and b as given below.

$$\bar{k} = \frac{\begin{vmatrix} y_0 & 1 \\ y_1 & 1 \end{vmatrix}}{x_0 - x_1} = \frac{y_0 - y_1}{x_0 - x_1} \quad (1.1)$$

and, $$\bar{b} = \frac{\begin{vmatrix} x_0 & y_0 \\ x_1 & y_1 \end{vmatrix}}{x_0 - x_1} = \frac{x_0 y_1 - x_1 y_0}{x_0 - x_1} \quad (1.2)$$

Finally, the equation for the straight line is $$y = \bar{k}x + \bar{b}, \quad (1.3)$$

Figure 3:
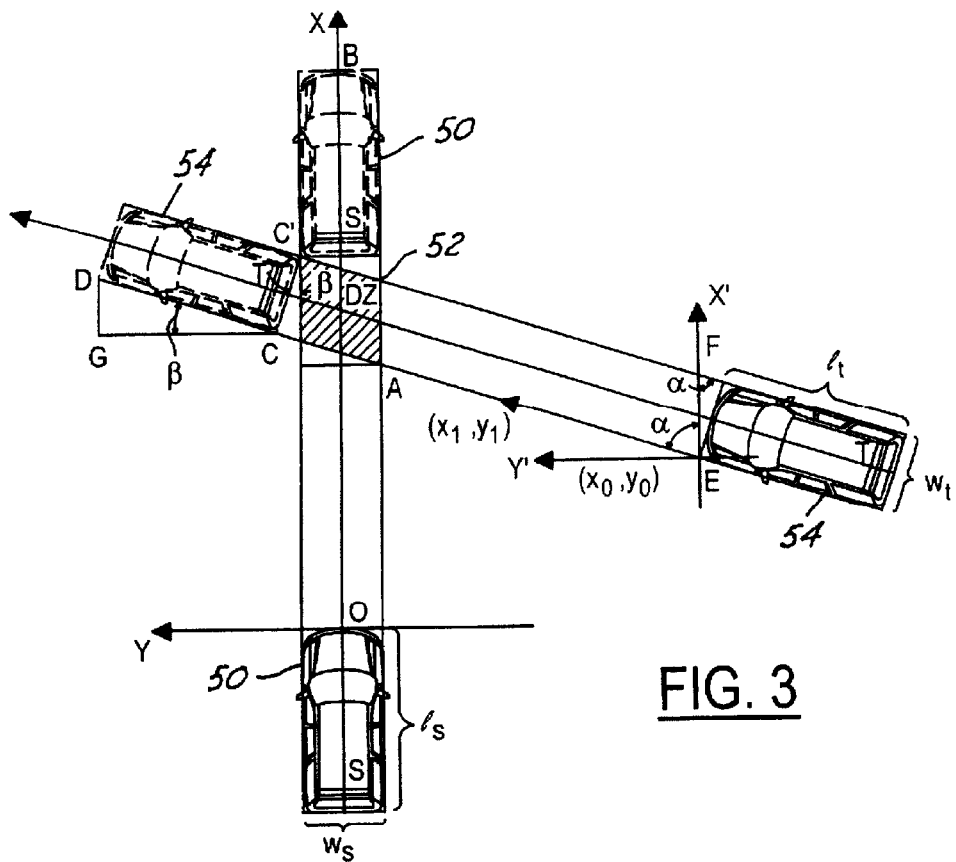
FIG. 3 is a top view of source vehicle and a target vehicle wherein the angle between the paths of the target vehicle and the source vehicle is between zero and $$\frac{\pi}{2}$$

For FIGS. 2, 3, and 4, $y_0 < 0$, which means that the left side of the target vehicle 54 is moving along the straight line (1.3). That is, the target vehicle 54 is moving from right to left in the Figures. If $y_0 > 0$ as in FIGS. 5, 6, and 7, then the right side of the target vehicle 54 is moving along straight line (1.3). That is, the target vehicle 54 is moving from the left to the right side of the Figures. Also, the angle $\alpha$ corresponds to the direction of travel of the target vehicle. Angle $\alpha$ is the angle between the direction of travel of the source vehicle and the direction of travel of the target vehicle 54. The various target vehicle travel direction angles are considered in the following cases.

Case (1.1): $y_0 < 0, \frac{\pi}{2} < \alpha < \pi$

The Starting Point of Danger Zone for the Source Vehicle 50.

The coordinates of point $A = (x_A, y_A)$ is determined. Clearly, $$y_A = \frac{w_s}{2} \quad (1.4)$$

and $$y_A = \bar{k}x_A + \bar{b},$$

because point A lies on line (1.3), then $$x_A = \frac{1}{\bar{k}}(y_A - \bar{b}), \quad (1.5)$$

where $\bar{k}, \bar{b}$ are determined based on formulas (1.1), (1.2).

The Last Point of Danger Zone for the Source Vehicle 50

The coordinates of point $C' = (x_{C'}, y_{C'})$ are then determined. To obtain point C it is necessary to construct the equation of the line for the right side of the target vehicle 54. The coefficient $\bar{k}$ of line (1.3) will be the same because these lines are parallel, and coefficient $\bar{b}$ will be more by the length of interval EF.

Using the following relations $$w_t = |EF|\sin(\pi - \alpha),$$

$$\sin(\pi - \alpha) = \sin \alpha,$$

then $$|EF| = \frac{w_t}{\sin \alpha}$$

The line equation in the form of $$y = \bar{k}x + \tilde{b}, \quad (1.6)$$

is determined where $\bar{k}$ is obtained from (1.1), and $$\tilde{b} = \bar{b} + \frac{w_t}{\sin \alpha}. \quad (1.7)$$

Furthermore, $$y_{C'} = -\frac{w_s}{2} \quad (1.8)$$

and $$y_{C'} = \bar{k}x_{C'} + \tilde{b},$$

Point C' lies on line (1.6), therefore $$x_{C'} = \frac{1}{\bar{k}}(y_{C'} - \tilde{b}), \quad (1.9)$$

where $\bar{k}, \tilde{b}$ bare determined from formulas (1.1), (1.7).

The last point of the danger zone 52 for vehicle S is point $B = (x_B, y_B)$. Its coordinates are $y_B=0$ $x_B=x_{C''}+l_s,$  (1.10)

where $x_{C''}$ is obtained from (1.9).

Starting Point of Danger Zone 52 for Target Vehicle 54

The starting point of danger zone for target vehicle 54 is point C. For the threat assessment algorithm only the Y-coordinate of point C in the $O_{XY}$ coordinate system is required.

From FIG. 2, $$y_C = -\frac{w_s}{2} - |HC|.$$

The length of interval HC is determined. Using $$|CC'| = w_t, \quad \beta = \pi - \frac{\pi}{2} - (\pi - \alpha) = \alpha - \frac{\pi}{2},$$

$$\sin\beta = \sin\left(\alpha - \frac{\pi}{2}\right) = -\sin\left(\frac{\pi}{2} - \alpha\right) = -\cos\alpha,$$

it is determined that $|HC|=|CC'|\sin \beta = -w_t \cos \alpha.$

It should be noted that in this case $$\alpha > \frac{\pi}{2}$$

so $-w_t \cos \alpha > 0$. Therefore $$y_C = -\frac{w_s}{2} + w_t \cos\alpha.$$  (1.11)

The Last Point of Danger Zone 52 for Target Vehicle 54

The coordinates of point $D=(x_D,y_D)$ are then determined. The Y coordinate of point D in the $O_{XY}$ coordinate system from FIG. 2 is given by, $y_D = y_A + |DG|.$ The length of the interval DG is then determined by:

$|DG|=|AD|\sin(\pi-\alpha).$

Using $|AD|=l_t, \sin(\pi-\alpha)=\sin \alpha,$ it is obtained that $|DG|=l_t \sin \alpha,$ and finally $y_D=y_A+l_t \sin \alpha,$ or $$y_D = \frac{w_s}{2} + l_t \sin\alpha,$$  (1.12)

where $y_A$ is obtained from (1.4).

Thus, formulas (1.5), (1.10), (1.11), (1.12) uniquely determine the main points of danger zone 52 in the case where $y_0<0$, $$\frac{\pi}{2} < \alpha < \pi.$$

Referring now to FIG. 3, another angle of target vehicle 54 relative to vehicle 50 is considered.

Case 1.2. $y_0 < 0, \quad 0 < \alpha < \frac{\pi}{2}$

Starting Point of Danger Zone 52 for Source Vehicle 50

The coordinates of point $A=(x_A,y_A)$ are first determined. Clearly, $$y_A = -\frac{w_s}{2}.$$  (1.13)

Similar to Case 1.1 we have $$x_A = \frac{1}{k}(y_A - \bar{b}).$$  (1.14)

The difference between (1.4), (1.5) and (1.13), (1.14) is in the sign of $y_A$. Coefficients $\bar{k}$, $\bar{b}$ are determined based on formulas (1.1), (1.2).

The Last Point of Danger Zone 52 for Source Vehicle 50

The coordinates of point $C'=(xC',yC')$ are found. Interval EF has the length $$|EF| = \frac{w_t}{\sin\alpha}$$

Similar to Case 1.1 it is obtained that $$y_{C'} = \frac{w_s}{2},$$  (1.15)

$$x_{C'} = \frac{1}{k}(y_C - \bar{b}),$$  (1.16)

where coefficients $\bar{k}$, $\bar{b}$ are determined from formulas (1.1), (1.7). The difference between (1.8), (1.9), (1.15), and (1.16) is in the sign of $y_{C''}$. The last point of the danger zone 52 for source vehicle 50 is $B=(x_B,y_B)$. The coordinates of B are $y_B=0$ $x_B=x_{C''}+l_s.$  (1.17)

Starting Point of Danger Zone 52 for Target Vehicle 54

The starting point of danger zone 52 for target vehicle 54 is point A. The Y coordinate of this point in the $O_{XY}$ coordinate system is obtained by using $y_A$ from (1.13).

The Last Point of Danger Zone 52 for Target Vehicle 54

The last point of danger zone for target vehicle 54 is $D=(x_D,y_D)$. The Y coordinate is determined. The lengths of intervals CH and CG are given by $|CH|=|CC'|\sin \beta,$ $|CG|=|CD|\cos \beta.$ Moreover, $$\beta = \pi - \frac{\pi}{2} - \alpha = \frac{\pi}{2} - \alpha,$$

$$\sin\beta = \sin\left(\frac{\pi}{2} - \alpha\right) = \cos\alpha,$$

$$\cos\beta = \cos\left(\frac{\pi}{2} - \alpha\right) = \sin\alpha,$$

$$|CC'| = w_t, \quad |CD| = l_t.$$

Therefore, $$|CH| = w_t \cos\alpha,$$

$$|CG| = l_t \sin\alpha.$$

As a result $$y_D = \frac{w_s}{2} + w_t \cos\alpha + l_t \sin\alpha. \tag{1.18}$$

Formulas (1.13), (1.14), (1.17), (1.18) uniquely determine the main points of the danger zone in the case where $y_0 < 0$, $$0 < \alpha < \frac{\pi}{2}.$$

Referring now to FIG. 4, a perpendicular relationship of target vehicle 54 and source vehicle 50 is considered in Case 1.3 where $y_0 < 0$, $$\alpha = \frac{\pi}{2}$$

Starting Point and the Last Point of Danger Zone 52 for Source Vehicle 50
If $$\alpha = \frac{\pi}{2}$$

then a straight line (1.3) will be orthogonal to the axis $O_x$. The starting point of the danger zone for source vehicle 50 is point A. The coordinates of A are, $$y_A = -\frac{w_s}{2}, \tag{1.19}$$

$$x_A = x_0 = x_1.$$

The last point of danger zone for source vehicle 50 is B. From FIG. 4, $$x_B = x_A + w_t + l_s,$$

or $$x_B = x_0 + w_t + l_s. \tag{1.20}$$

Starting Point of Danger Zone 52 for Target Vehicle 54
The Starting Point of Danger Zone 52 for Target Vehicle 54 is Point A.

$$y_A = -\frac{w_s}{2}. \tag{1.21}$$

The Last Point of Danger Zone 52 for Target Vehicle 54 is D.
Thus, $$y_D = \frac{w_s}{2} + l_t. \tag{1.22}$$

Thus, formulas (1.19)–(1.22) uniquely determine the main points of danger zone 52 in the case where $y_0 < 0$, $$\alpha = \frac{\pi}{2}.$$

Referring now to FIG. 5, $y_0 > 0$, $$\pi < \alpha < \frac{3\pi}{2},$$

note that the equation of the straight line (1.3), and formulas for its coefficients (1.1), (1.2) are the same for the present case.

Starting Point of Danger Zone 52 for Source Vehicle 50
The coordinates of point $A = (x_A, y_A)$ are determined. Clearly, $$y_A = -\frac{w_s}{2}, \tag{1.23}$$

$$x_A = \frac{1}{k}(y_A - \bar{b}). \tag{1.24}$$

The difference between (1.4), (1.5) and (1.23), (1.24) is in the sign of $y_A$.

The Last Point of Danger Zone 52 for Source Vehicle 50
The coordinates of point $C' = (xC', yC')$ are determined. For this case, it should be noted that the straight line (1.3) corresponds to the right side of the target vehicle 54 and the line (1.6) to the left side because $y_0 > 0$ now, but the equations of these lines will be the same. Moreover $\sin\alpha < 0$, if $y_0 > 0$ and $$\pi < \alpha < \frac{3\pi}{2}.$$

Denote $\beta = \pi - (2\pi - \alpha)$. Then $$\sin\beta = \sin(\pi - (2\pi - \alpha)) = \sin(-\pi + \alpha) = -\sin(\pi - \alpha) = -\sin\alpha.$$

As a result, $$|EF| = \frac{w_t}{\sin\beta} = -\frac{w_t}{\sin\alpha},$$

and finally $$\tilde{b} = \bar{b} - \frac{w_t}{\sin\alpha}. \tag{1.25}$$

The straight lines (1.3), (1.1), (1.2) and (1.6), (1.1), (1.25) do not depend on the sign of $y_0$. Therefore, these equations can be used for calculations of the coordinates of points A, B, C, D in both cases: $y_0 > 0$ and $y_0 < 0$. In addition, $$y_{C'} = \frac{w_s}{2}, \quad (1.26)$$

and $$x_{C'} = \frac{1}{\tilde{k}}(y_{C'} - \tilde{b}), \quad (1.27)$$

where coefficients $\tilde{k}$, $\tilde{b}$ are determined based on formulas (1.1), (1.25). The difference between (1.8), (1.9) and (1.26), (1.27) is in the sign of $y_{C'}$. The last point of danger zone 52 for source vehicle 50 is point B=$(x_B, y_B)$. The coordinates of B are $$y_B = 0$$

$$x_B = x_{C'} + l_s, \quad (1.28a)$$

where $x_{C'}$ is obtained from (1.27).

Starting Point of Danger Zone 52 for Target Vehicle 54

The starting point of danger zone 52 for target vehicle 54 is point C. Determination of the Y-coordinate of this point in the $O_{XY}$ coordinate system is required. Let $$\gamma = \pi - \frac{\pi}{2} - \beta,$$

then $$\gamma = \pi - \frac{\pi}{2} - (\pi - (2\pi - \alpha)) = \frac{3\pi}{2} - \alpha.$$

Using $$\sin\gamma = \sin\left(\frac{3\pi}{2} - \alpha\right) = -\cos\alpha,$$

$$|CC'| = w_t,$$

$$|CH| = \frac{|CC'|}{\sin\gamma} = -\frac{w_t}{\cos\alpha},$$

it is obtained that $$y_C = \frac{w_s}{2} + |CH| = \frac{w_s}{2} - \frac{w_t}{\cos\alpha}. \quad (1.28b)$$

The Last Point of Danger Zone 52 for Target Vehicle 54

The last point of danger zone 52 for target vehicle 54 is point D=$(x_D, y_D)$. The coordinates of point D are found using $$|DG| = |AD|\sin\beta = -l_t \sin\alpha,$$

$$|AG| = l_t \cos\beta,$$

$$\cos\beta = \cos(\pi - (2\pi - \alpha)) = \cos(-\pi + \alpha) = \cos(\pi - \alpha) = -\cos\alpha,$$

$$|AG| = -l_t \cos\alpha,$$

Thus $$x_D = x_A - |AG| = x_A + l_t \cos\alpha, \quad (1.29)$$

$$y_D = y_A - |DG| = y_A + l_t \sin\alpha. \quad (1.30)$$

In (1.29), (1.30) values $x_A$, $y_A$ are obtained from (1.23), (1.24).

Formulas (1.23), (1.24), (1.26)–(1.30) uniquely determine the main points of the danger zone 52 in the case where $y_0 > 0$, $$\pi < \alpha < \frac{3\pi}{2}.$$

Referring now to FIG. 6, the case where target vehicle 52 is traveling from left to right where $$\frac{3\pi}{2} < \alpha < 2\pi.$$

Case 2.2. $y_0 > 0$, $$\frac{3\pi}{2} < \alpha < 2\pi$$

Starting Point of Danger Zone 52 for Source Vehicle 50

The coordinates of point A=$(x_A, y_A)$ are found. Clearly, $$y_A = \frac{w_s}{2}, \quad (1.31)$$

$$x_A = \frac{1}{\tilde{k}}(y_A - \tilde{b}). \quad (1.32)$$

The difference between (1.23), (1.24) and (1.31), (1.32) is in sign of $y_A$.

The Last Point of Danger Zone 52 for Source Vehicle 50

It should be noted that the straight line (1.3) corresponds to the right side of the target and the line (1.6) to the left side because $y_0 > 0$ in Case 2.2. Equation (1.6) will be the same as shown below. Clearly from FIG. 6, $$|EF| = \frac{w_t}{\cos\beta},$$

$$\beta = \pi - \frac{\pi}{2} - (2\pi - \alpha) = -\frac{3\pi}{2} + \alpha,$$

$$\cos\beta = \cos\left(-\frac{3\pi}{2} + \alpha\right) = \cos\left(\frac{3\pi}{2} - \alpha\right) = -\sin\alpha,$$

Therefore, $$|EF| = -\frac{w_t}{\sin\alpha}.$$

The coefficient $\tilde{b}$ in (1.6) is obtained using formula (1.25). Finally it is obtained that $$y_C = -\frac{w_s}{2}, \quad (1.33)$$

$$x_C = \frac{1}{\tilde{k}}(y_C - \tilde{b}), \quad (1.34)$$

where the coefficient $\tilde{b}$ is deduced from (1.25). The difference between (1.26), (1.27) and (1.33), (1.33) is in the sign of $y_C$.

The last point of danger zone 52 for source vehicle 50 will be point B=$(x_B, y_B)$. The coordinates of point B are given by $$y_B = 0$$

$$x_B = x_C + l_s, \quad (1.35)$$

where $x_C$ is obtained from (1.34).

Starting Point of Danger Zone 52 for Target Vehicle 54

The starting point of danger zone 52 for target vehicle 54 is point A, with its coordinates given by (1.31), and (1.32).

The Last Point of Danger Zone 52 for Target Vehicle 54

The last point of danger zone 52 for target vehicle 54 is $D=(x_D, y_D)$. The coordinates of d are found using $$|C'H|=|CC'\sin\beta,$$

$$|C'G|=|C'D\cos\beta,$$

$$\cos\beta=-\sin\alpha$$

$$\sin\beta = \sin\left(-\frac{3\pi}{2}+\alpha\right) = -\sin\left(\frac{3\pi}{2}-\alpha\right) = \cos\alpha,$$

$$|CC'|=w_t, \ |C'D|=l_t,$$

then $$|C'H|=w_t \cos\alpha,$$

$$|C'G|l_t \sin\alpha.$$

As a result, $$y_D = -\frac{w_s}{2} - |C'H| - |C'G|$$

or $$y_D = -\frac{w_s}{2} - w_t\cos\alpha + l_t\sin\alpha. \tag{1.36}$$

Formulas (1.31)–(1.36) uniquely determine the main points of danger zone in the case when $$y_0 > 0, \ \frac{3\pi}{2} < \alpha < 2\pi.$$

Referring now to FIG. 7, the case where the target vehicle path is perpendicular to the path of the source vehicle and approaching from the left is considered.

Case 2.3. $y_0>0$, $$\alpha = \frac{3\pi}{2}$$

Starting Point and the Last Point of Danger Zone 52 for Source Vehicle 50

If $$\alpha = \frac{3\pi}{2}$$

then the straight line (1.3) will be orthogonal to the axis $O_x$. The starting point of danger zone 52 for source vehicle 50 is point A. The coordinates of A are given by $$y_A = \frac{w_s}{2}, \tag{1.37}$$

The last point of danger zone 52 for source vehicle 50 is point B. Clearly $$x_B=x_A+w_t+l_s,$$

or $$x_B=x_0+w_t+l_s. \tag{1.38}$$

Starting Point and the Last Point of Danger Zone 52 for Target Vehicle 54

The starting point of danger zone 52 for target vehicle 54 is point A, given by $$y_A = \frac{w_s}{2}. \tag{1.39}$$

The last point of danger zone 52 for target vehicle 54 is point D, given by $$y_D = -\frac{w_s}{2} - l_t. \tag{1.40}$$

The difference between (1.21), (1.22) and (1.39), (1.40) is in sign.

Formulas (1.37)–(1.40) uniquely determine the main points of the danger zone 52 in the case when $y_0>0$, $$\alpha = \frac{3\pi}{2}.$$

Referring now to FIG. 8, the time intervals of the danger zone are determined. Interval $[t_a,t_b]$ is the time when source vehicle 50 is in the danger zone 52. Interval $[t_c,t_d]$ is the time when target vehicle 54 is in the danger zone 52.

Time Interval for Source Vehicle 50

The moment of time $t_A$ when the front side of source vehicle 50 will be at point A is determined. This moment will be the initial point of time when source vehicle 50 goes through danger zone 52. Obviously, the X coordinate of source vehicle 50 is characterized by the equation $$x_s(t) = v_{s0}t + \frac{1}{2}a_st^2.$$

Then the following relation for $t_A$ and $x(t_A)=x_A$ holds $$x_A = v_{s0}t_A + \frac{1}{2}a_st_A^2,$$

where $x_A$ is calculated using (1.4), (1.5), $v_{s0}$, $a_s$ are the initial velocity and acceleration of source vehicle 50. Finally, $$t_A = \frac{-v_{s0} + \sqrt{v_{s0}^2 + 2a_sx_A}}{a_s} \text{ is obtained.} \tag{1.41}$$

In (1.41) only positive values of $t_A$ are chosen.

The moment of time $t_B$ when the front side of source vehicle 50 will be at point B. This moment will be the last point of time when source vehicle 50 goes through danger zone 52. Clearly, $$t_B = \frac{-v_{s0} + \sqrt{v_{s0}^2 + 2a_s x_B}}{a_s}, \quad (1.42)$$

where $x_B$ is determined using formulas (1.7)–(1.10)

It should be noted that in (1.42) only positive values of $t_B$ are chosen. The interval $[t_A, t_B]$ is the time when the source vehicle intersects danger zone 52. Formulas (1.41), (1.42) are the same and useful for all cases described above.

Time Interval for Target Vehicle 54

The moment in time $t_C$ when the front side of target vehicle 54 will be at point C is determined. This moment will be the initial point of time when target vehicle 54 goes through danger zone 52. The Y coordinate of target vehicle 54 is given by the equation $$y_t(t) = y_0 + \left(v_{t0}t + \frac{1}{2}a_t t^2\right)\sin\alpha,$$

where $v_{t0}$, $a_t$ are the initial velocity and acceleration of target vehicle 54. These values are available from object tracking using the sensing of FIG. 1.

Then the following relation holds for $t_C$ and $y(t_C) = y_C$, $$y_C = y_0 + \left(v_{t0}t_C + \frac{1}{2}a_t t_C^2\right)\sin\alpha,$$

where $Y_C$ is calculated using (1.11). Finally, the relation $$t_C = \frac{-v_{t0}\sin\alpha + \sqrt{v_{t0}^2\sin^2\alpha - 2a_t(y_0 - y_C)\sin\alpha}}{a_t \sin\alpha} \quad (1.43)$$

is obtained.

The moment of time $T_D$ when the front side of source vehicle 50 will be at point D is determined. This moment will be the last point of time when target vehicle 54 goes through danger zone, given by $$t_D = \frac{-v_{t0}\sin\alpha + \sqrt{v_{t0}^2\sin^2\alpha - 2a_t(y_0 - y_D)\sin\alpha}}{a_t \sin\alpha}, \quad (1.44)$$

where $y_D$ is determined using formula (1.12).

In (1.43), (1.44) only positive value of $T_C$ and $T_D$ are chosen. These formulas will be the same and useful for cases: 1.1, 1.2, 1.3 because $y_0 < 0$ and $\sin\alpha > 0$ if $\alpha \in (0, \pi)$. For cases: 2.1, 2.2, 2.3 it is necessary to use (1.45), (1.46) because $y_0 > 0$ and $\sin\alpha < 0$ if $\alpha \in (\pi, 2\pi)$.

$$t_C = \frac{-v_{t0}\sin\alpha - \sqrt{v_{t0}^2\sin^2\alpha - 2a_t(y_0 - y_C)\sin\alpha}}{a_t \sin\alpha}, \quad (1.45)$$

$$t_D = \frac{-v_{t0}\sin\alpha - \sqrt{v_{t0}^2\sin^2\alpha - 2a_t(y_0 - y_D)\sin\alpha}}{a_t \sin\alpha}. \quad (1.46)$$

Thus, interval $[t_C, t_D]$ is the time the target vehicle 54 intersects danger zone 52.

The time intervals of each of the vehicles for each of the cases (1.1)–(1.3) and (2.1)–(2.3) described above may be determined. The following summarizes the formulas for each case:

Case 1.1 (FIG. 2)
  Source Vehicle 50
    Point A: $x_A$—using (1.4), (1.5)
    Point B: $x_B$—using (1.7)–(1.10)
    Time moment $t_A$—using (1.41)
    Time moment $t_B$—using (1.42)
  Target Vehicle 54
    Point C: $y_C$—using (1.11)
    Point D: $y_D$—using (1.12)
    Time moment $t_C$—using (1.43)
    Time moment $t_D$—using (1.44)
Case 1.2 (FIG. 3)
  Source Vehicle 50
    Point A: $x_A$—using (1.13), (1.14)
    Point B: $x_B$—using (1.7), (1.15)–(1.17)
    Time moment $t_A$—using (1.41)
    Time moment $t_B$—using (1.42)
  Target Vehicle 54
    Point A: $y_A$—using (1.13)
    Point D: $y_D$—using (1.18)
    Time moment $t_C = t(y_A)$—using (1.43)
    Time moment $t_D$—using (1.44)
Case 1.3 (FIG. 4)
  Source Vehicle 50
    Point A: $x_A = 0$—using (1.19)
    Point B: $x_B$—using (1.20)
    Time moment $t_A$—using (1.41)
    Time moment $t_B$—using (1.42)
  Target Vehicle 54
    Point A: $y_A$—using (1.21)
    Point D: $y_D$—using (1.22)
    Time moment $t_C = t(y_A)$—using (1.43), $\sin\alpha = 1$
    Time moment $t_D$—using (1.44), $\sin\alpha = 1$
Case 2.1 (FIG. 5)
  Source Vehicle 50
    Point A: $x_A$—using (1.23), (1.24)
    Point B: $x_B$—using (1.25)–(1.28a)
    Time moment $t_A$—using (1.41)
    Time moment $t_B$—using (1.42)
  Target Vehicle 54
    Point C: $y_C$—using (1.28b)
    Point D: $y_D$—using (1.23), (1.30)
    Time moment $t_C$—using (1.45)
    Time moment $t_D$—using (1.46)
Case 2.2 (FIG. 6)
  Source Vehicle 50
    Point A: $x_A$—using (1.31), (1.32)
    Point B: $x_B$—using (1.25), (1.33)–(1.35)
    Time moment $t_A$—using (1.41)
    Time moment $t_B$—using (1.42)
  Target Vehicle 54
    Point A: $y_A$—using (1.31)
    Point D: $y_D$—using (1.36)
    Time moment $t_C = t(y_A)$—using (1.45)
    Time moment $t_D$—using (1.46)
Case 2.3 (FIG. 7)
  Source Vehicle 50
    Point A: $x_A = x_0$—using (1.37)
    Point B: $x_B$—using (1.38)

Time moment $t_A$—using (1.41)

Time moment $t_B$—using (1.42)

Target Vehicle 54

Point A: $y_A$—using (1.39)

Point D: $y_D$—using (1.40)

Time moment $t_C=t(y_A)$—using (1.45), $\sin\alpha=-1$

Time moment $t_D$—using (1.46), $\sin\alpha=-1$

The previous results are two intervals for each case: 1) $[t_A,t_B]$—the time when source vehicle 50 intersects danger zone 52, and 2) $[t_C,t_D]$—the time when target vehicle 54 intersects danger zone. Thus when the vehicles occupy the danger zone 52 at the same time an appropriate countermeasure may be activated.

Referring now to FIG. 8, the classification of an impact situation may be determined.

An analysis method for identification and classification of real impact situations is described. This method is based on a study of the relative location of the time intervals when both vehicles are in danger zone.

Case 1.1. $y_0 < 0$, $\frac{\pi}{2} < \alpha < \pi$

Situation No. 1 (S-1) Not a dangerous intersection.

The time intervals $[t_A,t_B]$, $[t_C,t_D]$ are obtained using (1.41), (1.42), (1.43) and (1.44). The intersection of these intervals determines an impact situation. For example, if intervals $[t_A,t_B]$, $[t_C,t_D]$ do not intersect and $[t_A,t_B]$ precedes to $[t_C,t_D]$ then source vehicle 50 will go through danger zone 52 before target vehicle 54 will be at point C. Therefore, the situation of FIG. 8 is not dangerous.

Situation description (S-1)

Title: "Not a dangerous intersection".

Time test: $t_B < t_C$. (2.1)

Time of impact $t_i$: No impact.

Output signal: "Not dangerous".

Countermeasure Activation: No.

Situation No. 2 (S-2) Not a dangerous source vehicle right side impact.

Referring now to FIG. 9, the next situation S-2 is considered. Let $l_D$ be the length of the back part of source vehicle 50 so that the impact into this part is not dangerous for occupants. In this case point K is chosen as the first special point of danger zone 52. If subject source vehicle 50 reaches this point before impact then the scenario is not dangerous.

The X coordinate of point K is given by $$x_K = x_B - l_D. \quad (2.2)$$

Then the moment of time $t_K$ when the front side of source vehicle 50 will be at point K may be found. For $t_K$ a formula similar to (1.41) is used, $$t_K = \frac{-v_{s0} + \sqrt{v_{s0}^2 + 2a_s x_K}}{a_s}, \quad (2.3)$$

where $x_K$ is obtained from (2.2).

Situation description (S-2)

Title: "Not dangerous right side impact"

Time test: $t_K < t_C \leq t_B$ (2.4)

Time of impact $t_i$: $t^i = t_C$

Output signal: "Not dangerous"

Countermeasure Activation: No.

Situation 3 (S-3) Dangerous right side impact

Referring now to FIG. 10, the second special point of danger zone 52 is point L. This point has an X coordinate $$x_L = x_B - l_s. \quad (2.5)$$

It should be noticed that L is the last point of danger zone 52 when impact for source vehicle 50 is a right side impact. The moment of time $t_L$ when the front side of source vehicle 50 will be in point L and is given by $$t_L = \frac{-v_{s0} + \sqrt{v_{s0}^2 + 2a_s x_L}}{a_s}, \quad (2.6)$$

where $x_L$ is obtained from (2.5).

Situation description (S-3)

Title: "Dangerous right side impact"

Time test: $t_L \leq t_C \leq t_K$ (2.7)

Time of impact $t_i$: $t_i = t_C$

Output signal: "Dangerous"

Countermeasure Activation: Activate appropriate countermeasure for right side impact to host vehicle.

Situation 4 (S-4) Dangerous Target's front impact from right side

Referring now to FIG. 11, the situation when $t_C < t_L$ and $t_{R_s} < t_{R_t}$ is considered. Here $t_{R_s}$, $t_{R_t}$, are moments of time when the front side of source vehicle 50 and target vehicle 54 will be at point R. P denotes the point of impact. The moment of impact $t_i$ must be found. Impact is imminent when the front side of source vehicle 50 is at point M and the front side of target vehicle 54 is at point N, i.e.

$$t_i = t_M = t_N. \quad (2.8)$$

Using $$y_C = y_0 + v_{t0}\sin\alpha\, t_C + \frac{1}{2}a_t\sin\alpha\, t_C^2,$$

$$y_N = y_0 + v_{t0}\sin\alpha\, t_C + \frac{1}{2}a_t\sin\alpha\, t_N^2,$$

$$y_N - y_C = v_{t0}\sin\alpha\,(t_N - t_C) + \frac{1}{2}a_t\sin\alpha\,(t_N^2 - t_C^2),$$

$$\cos\beta = \cos(\alpha - \frac{\pi}{2})\sin\alpha,$$

Thus, $$|NC| = \frac{y_N - y_C}{\cos\beta} = v_{t0}(t_N - t_C) + \frac{1}{2}a_t(t_N^2 - t_C^2).$$

Then $$x_L = v_{s0}t_L + \frac{1}{2}a_s t_L^2,$$

$$x_M = v_{s0}t_M + \frac{1}{2}a_s t_M^2,$$

$$|LM| = x_L - x_M = v_{s0}(t_L - t_M) + \frac{1}{2}a_s(t_L^2 - t_M^2).$$

Moreover $$|PC'|=|LM|,$$

$$|N'C'|=|NC|,$$

therefore $$|NC|=|LM|\sin\beta,$$

where $$\sin\beta = \sin\left(\alpha - \frac{\pi}{2}\right) = -\cos\alpha.$$

As a result, $$v_{t0}(t_N - t_C) + \frac{1}{2}a_t(t_N^2 - t_C^2) = -\left[v_{s0}(t_L - t_M) + \frac{1}{2}a_s(t_L^2 - t_M^2)\right]\cos\alpha.$$

Using (2.8), the equation for the moment $t_i$ is obtained $$\frac{1}{2}(a_t - a_s\cos\alpha)t_i^2 + (v_{t0} - v_{s0}\cos\alpha)t_i + \qquad(2.9)$$

$$\left(v_{s0}t_L + \frac{1}{2}a_st_L^2\right)\cos\alpha - \left(v_{t0}t_C + \frac{1}{2}a_tt_C^2\right) = 0.$$

The solution of (2.9) has the form $$t_i = -\frac{v_{t0} - v_{s0}\cos\alpha}{a_t - a_s\cos\alpha} \pm \frac{\sqrt{(v_{t0} - v_{s0}\cos\alpha)^2 - 2(a_t - a_s\cos\alpha)\left[\left(v_{s0}t_L + \frac{1}{2}a_st_L^2\right)\cos\alpha - \left(v_{t0}t_C + \frac{1}{2}a_tt_C^2\right)\right]}}{a_t - a_s\cos\alpha}. \qquad(2.10)$$

In (2.10) only positive values of $t_i$ are chosen, because $\cos\alpha<0$ for $$\frac{\pi}{2} < \alpha < \pi.$$

Formula (2.10) is true until impact point P belongs to interval C'R. Point R is the third special point of danger zone 52. To create the time test its coordinates and values $t_{R_s}$, $t_{R_t}$ are found. R is the I,) intersection point of two straight lines:

$$y = -\frac{w_s}{2},$$

$y=\bar{k}x+\bar{b}$, therefore an equation $$-\frac{w_s}{2} = \bar{k}x + \bar{b}$$

is obtained. Rearranging the equation, $$x_R = -\frac{\frac{1}{2}w_s + \bar{b}}{\bar{k}}.$$

Then $$y_R = \bar{k}x_R + \bar{b}.$$

Now we can find moments of time $t_{R_s}$, $t_{R_t}$, similar to (1.41), (1.43) and are given by $$t_{R_s} = \frac{-v_{s0} + \sqrt{v_{s0}^2 + 2a_sx_R}}{a_s}, \qquad(2.11)$$

and $$t_{R_t} = \frac{-v_{t0}\sin\alpha + \sqrt{v_{t0}^2\sin^2\alpha - 2a_t(y_0 - y_R)\sin\alpha}}{a_t\sin\alpha}. \qquad(2.12)$$

Situation description (S-4)

Title: "Dangerous target's front impact from right side".

Time test: $t_C<t_L$ and $t_{R_s}\leq t_{R_t}$. (2.13)

Time of impact $t_i$: $t_i$ is calculated using (2.10)

Output signal: "Dangerous"

Countermeasure Activation: Activate appropriate frontal and right side countermeasures for host vehicle.

Situation No.5 (S-5) Dangerous Subject's front impact from right side

Referring now to FIG. 12, a situation when $t_A<t_{R_t}<t_{R_s}$ is considered. The moment of impact $t_i$ is found. The point of impact is P, therefore $t_i=_{P_s}=t_{P_t}$ and, $$y_A = y_0 + v_{t0}\sin\alpha\, t_{A_t} + \frac{1}{2}a_t\sin\alpha\, t_{A_t}^2,$$

$$y_P = y_0 + v_{t0}\sin\alpha\, t_{P_t} + \frac{1}{2}a_t\sin\alpha\, t_{P_t}^2,$$

$$y_A - y_P = v_{t0}\sin\alpha(t_{A_t} - t_{P_t}) + \frac{1}{2}a_t\sin\alpha(t_{A_t}^2 - t_{P_t}^2),$$

where $t_{A_t}$ is obtained following a similar process used for calculating $t_C$ from (1.43), $$t_{A_t} = \frac{-v_{t0}\sin\alpha + \sqrt{v_{t0}^2\sin^2\alpha - 2a_t(y_0 - y_A)\sin\alpha}}{a_t\sin\alpha}$$

and $y_A=w_s/2$.

From FIG. 12

$$|AP'|=y_A-y_P.$$

Further $$x_P = v_{s0}t_{P_s} + \frac{1}{2}a_st_{P_s}^2,$$

$$x_{P'} = x_A = v_{s0}t_A + \frac{1}{2}a_st_A^2,$$

$$|PP'| = x_P - x_A = v_{s0}(t_{P_s} - t_A) + \frac{1}{2}a_s(t_{P_s}^2 - t_A^2),$$

where $t_A$ is obtained from (1.41).

Using relations $$|PP'|=|AP'|\tan\beta,$$

$$|PP'| = |AP'|\tan\beta,$$

$$\tan\beta = \tan\left(\alpha - \frac{\pi}{2}\right) = -\tan\left(\frac{\pi}{2} - \alpha\right) = -\cot\alpha = -\frac{\cos\alpha}{\sin\alpha},$$

it may be obtained $$v_{s0}(t_{P_s} - t_A) + \frac{1}{2}a_s(t_{P_s}^2 - t_A^2) = -\left[v_{t0}(t_{A_t} - t_{P_t}) + \frac{1}{2}a_t(t_{A_t}^2 - t_{P_t}^2)\right]\cos\alpha.$$

And finally an equation for $t_i = t_{P_s} = t_{P_t}$ is determined as $$\frac{1}{2}(a_s - a_t\cos\alpha)t_i^2 + (v_{s0} - v_{t0}\cos\alpha)t_i + \left(v_{t0}t_{A_t} + \frac{1}{2}a_t t_{A_t}^2\right)\cos\alpha - \left(v_{s0}t_A + \frac{1}{2}a_s t_A^2\right) = 0. \quad (2.14)$$

The solution of (2.14) has the form $$t_i = -\frac{v_{s0} - v_{t0}\cos\alpha}{a_s - a_t\cos\alpha} \pm \frac{\sqrt{(v_{s0} - v_{t0}\cos\alpha)^2 - 2(a_s - a_t\cos\alpha)\left[\left(v_{t0}t_{A_t} + \frac{1}{2}a_t t_{A_t}^2\right)\cos\alpha - \left(v_{s0}t_A + \frac{1}{2}a_s t_A^2\right)\right]}}{a_s - a_t\cos\alpha}. \quad (2.15)$$

In (2.15) only positive values of $t_i$ are chosen, because $\cos\alpha < 0$ for $$\frac{\pi}{2} < \alpha < \pi.$$

Situation description (S-5)

Title: "Dangerous subject's front impact from right side"

Time test: $t_A < t_{R_t} < t_{R_s}$ (2.16)

Time of impact $t_i$: $t_i$ is calculated using (2.15)

Output signal: "Dangerous"

Countermeasure

Activation: Activate appropriate frontal countermeasures for the host vehicle.

Situation 6 (S-6) Dangerous Subject Vehicle front impact.

Referring now to FIG. 13, a situation when $t_{A_t} \leq t_A \leq t_D$ is considered.

The point of impact is A. In this case the moment of impact $t_i$ is equal to $t_A$, $t_i = t_A$ is found using (1.41).

Situation description (S-6)

Title: "Dangerous subject's front impact".

Time test: $t_{A_t} \leq t_A \leq t_D$ (2.17)

Time of impact $t_i$: $t_i$ is calculated using(1.41)

Output signal: "Dangerous".

Countermeasure

Activation: Activate appropriate frontal countermeasures for the host vehicle.

The classification of the impact situations described above is summarized. Based on the object tracking information, the controller decides which of the six impact situations (previously described cases 1.1,1.2,1.3,2.1,2.2 or 2.3) is applicable to the present situation. The following values are calculated:

$t_K$ using (2.3),
$t_L$ using (2.6),
$t_{R_s}$ using (2.11), and
$t_{R_t}$ using (2.12).

The following time tests are then used to evaluate potential collision scenarios Case 1 If $t_B < t_C$, (2.1)then
   Output Signal—"Not dangerous"

Case 2 If $t_K < t_C \leq t_B$, (2.4)
   then
   Time of impact: $t_i = t_C$,
   Then Output Signal—"Not dangerous"
   Countermeasure Activation: "No"

Case 3 If $t_L \leq t_C \leq t_K$, (2.7)
   then
   Time of impact: $t_i = t_C$,
   Then Output Signal—"Dangerous"
   Countermeasure Activation: "Activate countermeasure for the right side"

Case 4 If $t_C < t_L$ and $t_{R_s} \leq t_{R_t}$, (2.13)
   then
   Time of impact: $t_i$ is calculated using (2.10) Then Output Signal—"Dangerous"
   Countermeasure Activation: "Activate appropriate frontal and right side countermeasures"

Case 5 If $t_A < t_{R_t} < t_{R_s}$, (2.16)
   then
   Time of impact: $t_i$ is calculated using (2.15),
   Then Output Signal—"Dangerous"
   Countermeasure Activation: "Activate appropriate frontal countermeasure"

Case 6 If $t_{A_t} \leq t_A \leq t_D$, (2.17)
   then
   Time of impact: $t_i$ is calculated using (1.41),
   Then Output Signal—"Dangerous"
   Countermeasure Activation: "Activate appropriate frontal countermeasure"

It should be noted that these cases refer to FIG. 2 from above. A similar approach is be used to develop algorithms for the scenarios of FIGS. 3–7.

In response to the above classification, an appropriate countermeasure may be activated. For example, the source vehicle may be programmed to nose dip, only when the front of the host vehicle is involved in the accidents. The present invention significantly improves the quality of threat assessment by including length and width of the host and target vehicles in its determination.

Referring now to FIGS. 14A–14E, a flow chart of the system of the present invention is illustrated. The flow chart summarizes the above detailed description. The method starts in FIG. 100. In step 102 the target vehicle or target object information such as position, velocity, acceleration, and direction of motion with reference to the source vehicle and object classification data are obtained from the radar, vision and/or the transponder based pre-sensing system. In step 104 the host or source vehicle dimensions, velocity, and acceleration are determined. In block 106 the target position and direction of motion are used to select the applicable set of equations for the danger zone calculations. In step 108 the coordinates of the starting point of the danger zone for the source vehicle are determined. In step 110 the coordinates of the ending points of the danger zone for the source vehicle are determined.

In step 112 the moment of time $t_A$ when the front of the host vehicle enters the danger zone is determined. The moment of time $t_B$ when the host vehicle leaves the danger zone is calculated in step 114. The coordinates of the starting point of the danger zone for the target vehicle are determined in block 116. The coordinates of the finishing point of the danger zone for the target vehicle are determined in step 118.

The moment of time $t_C$ when the front of the target vehicle enters the danger zone is determined in step 120. In step 122 the moment of time when the target vehicle leaves the danger zone is determined. In block 124 the coordinates of point K defined above is determined. In step 126 the moment of time $t_K$ when the source vehicle reaches the special point K is determined. In step 128 the coordinates for the special point L of the danger zone 52 is determined. In step 130 the moment of time $t_L$ when the source vehicle 50 reaches the point L is determined. In block 132 the coordinates of special point R of the danger zone 52 is determined. In step 134 the time $t_{Rs}$ and $t_{Rt}$ when the source vehicle 50 and the target reaches point R the danger zone 52 is determined.

When $t_C$ is equal to or greater than $t_L$ and is less than or equal to $t_K$ the time to impact $t_I$ is determined in block 138. When the time to impact $t_I$ is less than a countermeasure specific critical time, step 144 activates the proper side countermeasures. In step 146 a collision is confirmed with the source vehicle sensors. If the collision is confirmed, the system stops in step 148. If the system does not confirm a collision in step 146 or the time to impact is greater than the critical time, block 150 is executed which returns to block 102.

Referring back to step 136, when the time $t_C$ is not between $t_L$ or $t_K$ step 152 is executed. When $t_C$ is less than $t_L$ and $t_R$ is less than or equal to $t_{Rt}$, then the time to impact is calculated in block 154. In block 156, if the time to impact $t_I$ is less than a critical time, then step 158 is executed in which the frontal and proper side countermeasures are activated. In step 160 the collision is confirmed with the vehicle sensors. If the collision is confirmed with the vehicle sensors the system stops in step 162. If a vehicle collision is not confirmed in block 160, block 164 is executed. Also, in step 156 if the time to impact is greater than the critical time then block 164 is also executed. Step 164 returns the system to step 102 above.

Referring back to block 152, if the time $t_C$ is not less than the time $t_L$ or the time $t_R$ is not less than or equal to the time $t_{Rt}$, step 166 is executed. In step 166 the time $t_{Rt}$ is compared to the time $t_A$ and $t_R$. When the time $t_{Rt}$ is between the times $t_A$ and $t_R$, block 168 is executed. In block 168 the time to impact is calculated. If the time to impact is less than a critical time in block 170 then step 172 is executed. In step 172 an appropriate frontal countermeasure on the source vehicle is activated. In step 174 the collision is confirmed with the vehicle sensors. If the collision is confirmed with the vehicle sensors step 176 is executed in which the system stops. In step 174 if the collision is not confirmed with the vehicle sensors the system returns to step 102 in block 178. Also, the system enters block 178 when the time to impact is greater than the critical time in step 170.

Referring back to step 166, when the time $t_{Rt}$ is not between $t_A$ and $t_R$ the system executes step 180. In step 180 the system checks the time $t_A$ to determine whether $t_A$ is between or equal to $t_{At}$ or $t_D$. If $t_A$ is greater than or equal to $t_{At}$ and less than or equal to $t_D$ the system returns to step 168. If the time $t_A$ is not between $t_{At}$ and $t_D$ the system returns to block 102.

Thus, the system first determines the danger zone of the vehicles and the points therein. Next, each of the times for reaching various points of the danger zone is determined. Likewise, other points are set up to classify the type of impact such as front, side or front and side.

While particular embodiments of the invention have been shown and described, numerous variations and alternate embodiments will occur to those skilled in the art. Accordingly, it is intended that the invention be limited only in terms of the appended claims.

What is claimed is:

1. A pre-crash sensing system for a source vehicle having a source vehicle length and a source vehicle width coupled to a countermeasure system comprising:

an object sensor generating an object distance signal and object relative velocity signal and an object classification signal; and a controller coupled to said object sensor for activating the countermeasure system in response to said object distance, relative velocity and said object classification signal.

2. A system as recited in claim 1 wherein said object classification corresponds to an object width and an object length.

3. A system as recited in claim 1 wherein said object sensor comprises a lidar sensor and a vision system.

4. A system as recited in claim 1 wherein said object sensor comprises a radar sensor and a vision system.

5. A system as recited in claim 2 wherein said controller determines a danger zone in response to the object length and object width.

6. A system as recited in claim 2 wherein said controller determines the danger zone in response to the source vehicle length, source vehicle width and object length and object width.

7. A system as recited in claim 2 wherein said controller determines a danger zone having a length corresponding to the width of the object vehicle.

8. A system as recited in claim 1 further comprising a vehicle speed sensor generating a speed signal corresponding to the longitudinal speed of the vehicle; wherein said controller activates said countermeasure in response to the longitudinal speed signal.

9. A system as recited in claim 1 wherein the object comprises a target vehicle.

10. A system as recited in claim 1 wherein said controller determines a danger zone having a width corresponding to the source vehicle width of the source vehicle.

11. A system as recited in claim 1 further comprising storing the source vehicle length and the source vehicle width in a memory.

12. A method for operating a pre-crash sensing system for an automotive vehicle having a countermeasure system, said method comprising:

determining an object distance, relative velocity and object travel direction;

determining an object classification with a vision system;

determining an object length and object width corresponding to the object classification; and activating the countermeasure system in response to the object length and object width and the object distance and relative velocity.

13. A method as recited in claim 12 wherein activating the countermeasure system comprises pre-arming airbags, pre-tensioning motorized belt pretensioners, dipping the nose of the vehicle and adjusting the host vehicle suspension height.

14. A method as recited in claim 12 wherein said object comprises a target vehicle.

15. A method for operating a pre-crash sensing system for a source vehicle having a source vehicle width and length having a countermeasure system, said method comprising:

measuring a source vehicle speed;

determining an object distance, object relative velocity and object travel direction;

determining an object classification with a vision system;

determining an object length and object width corresponding to the object classification;

determining a danger zone based on the source vehicle length, source vehicle width and object length and object width; and activating the countermeasure system in response to the danger zone, the source vehicle speed, the object distance and relative velocity.

16. A method as recited in claim 15 wherein activating the countermeasure system comprises pre-arming airbags, pre-tensioning motorized belt pretensioners, dipping the nose of the vehicle and adjusting the host vehicle suspension height.

17. A method as recited in claim 15 wherein said object comprises a target vehicle.

\* \* \* \* \*